(12) United States Patent
Norton

(10) Patent No.: US 8,235,412 B2
(45) Date of Patent: Aug. 7, 2012

(54) FOLDING TRAILER

(75) Inventor: Michael Norton, Smithfield Plains (AU)

(73) Assignees: Michael Norton, South Australia (AU); Anthony Andretti, South Australia (AU)

( * ) Notice: Subject to any disclaimer, the term of this patent is extended or adjusted under 35 U.S.C. 154(b) by 730 days.

(21) Appl. No.: 11/718,030

(22) PCT Filed: Oct. 28, 2005

(86) PCT No.: PCT/AU2005/001666
§ 371 (c)(1),
(2), (4) Date: May 30, 2007

(87) PCT Pub. No.: WO2006/045155
PCT Pub. Date: May 4, 2006

(65) Prior Publication Data
US 2009/0134605 A1     May 28, 2009

(30) Foreign Application Priority Data

Oct. 28, 2004   (AU) .............................. 2004906196

(51) Int. Cl.
*B62D 63/00*      (2006.01)
(52) U.S. Cl. ........................................ 280/656; 280/639
(58) Field of Classification Search .................. 280/638, 280/639, 651, 652, 656
See application file for complete search history.

(56) References Cited

U.S. PATENT DOCUMENTS

| | | | | |
|---|---|---|---|---|
| 3,305,243 A * | 2/1967 | Manfredi, Jr. et al. | ........ | 280/651 |
| 4,175,768 A * | 11/1979 | Thackray | ...................... | 280/652 |
| 4,239,258 A | 12/1980 | Burris | | |
| 4,362,316 A * | 12/1982 | Wright | ........................ | 280/656 |
| 4,746,142 A * | 5/1988 | Davis | ............................ | 280/656 |
| 4,786,073 A | 11/1988 | Harper | | |
| 5,570,898 A | 11/1996 | Albert | | |
| 5,673,928 A * | 10/1997 | Jury | .............................. | 280/645 |
| 6,659,497 B1 * | 12/2003 | Owens | .......................... | 280/656 |
| 2003/0102655 A1 | 6/2003 | Thompson | | |

FOREIGN PATENT DOCUMENTS

| | | |
|---|---|---|
| AU | 50255/93 A | 5/1994 |
| GB | 2 251 827 A | 7/1992 |
| GB | 2 361 460 A | 10/2001 |

OTHER PUBLICATIONS

International Search Report dated Dec. 20, 2005 issued in PCT/AU2005/001666, 5 pages.

* cited by examiner

*Primary Examiner* — Frank Vanaman
(74) *Attorney, Agent, or Firm* — Hitchcock Evert LLP

(57) ABSTRACT

A trailer of the type adapted to be folded from an expanded state to a compact state. The trailer includes a central chassis portion with pivot means at longitudinal ends thereof, as well as a front and rear chassis portion pivotably connected to the central chassis portion through respective front and rear pivot means. When the trailer is in the expanded state, the front chassis portion, rear chassis portion and central chassis portion extend in a substantially horizontal plane, and when the trailer is in the compact state, the front chassis portion and rear chassis portion extend substantially perpendicularly to the central chassis portion. In this state, at least one of the front or rear chassis portions extends at least partially below the central chassis portion to thereby assist in stabilizing the trailer in the compact state.

19 Claims, 21 Drawing Sheets

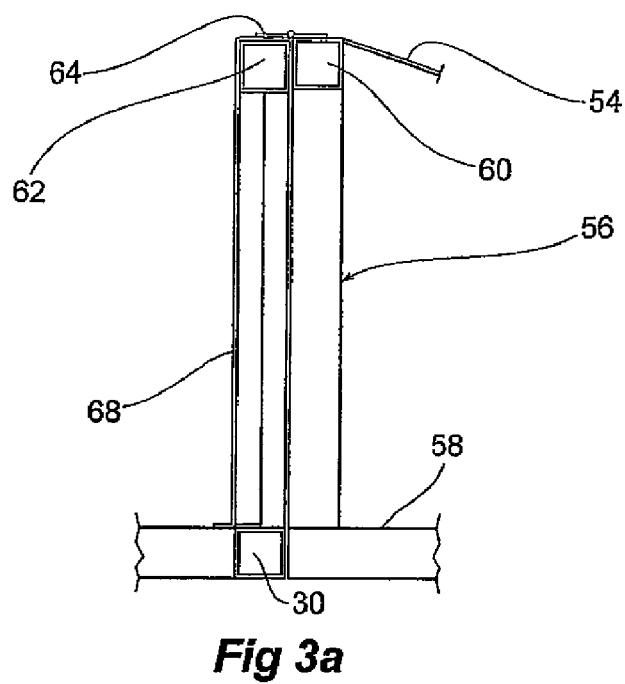
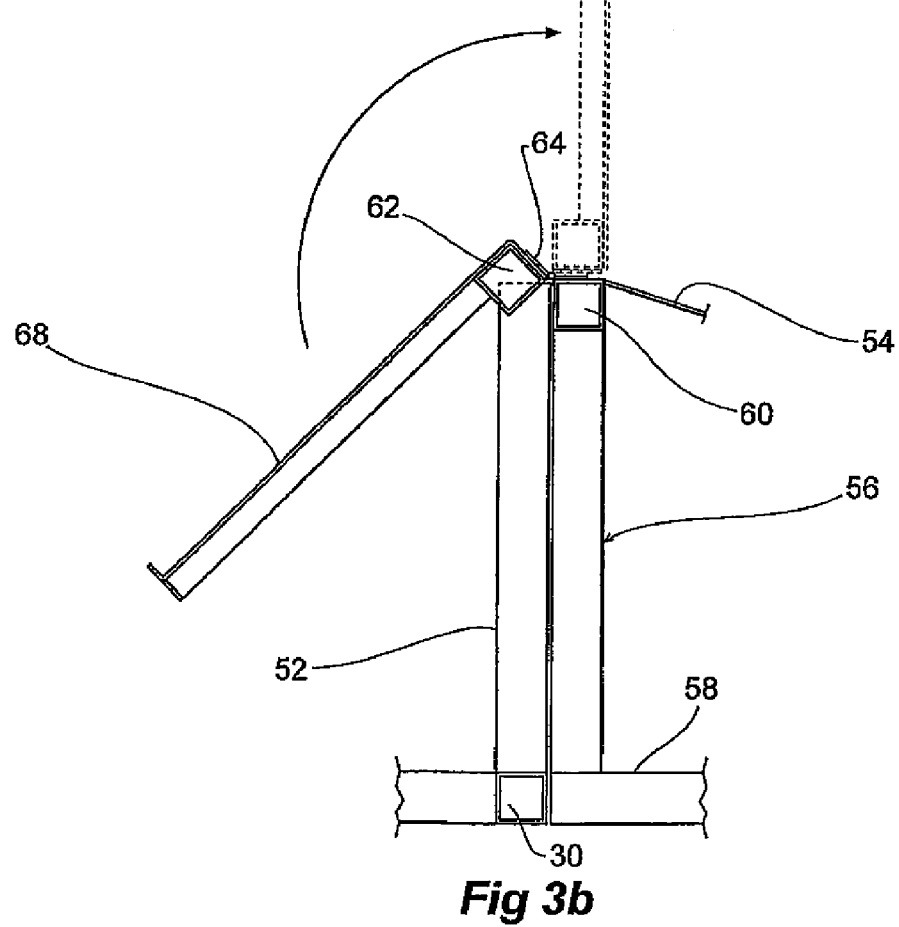
Fig 3a
Fig 3b

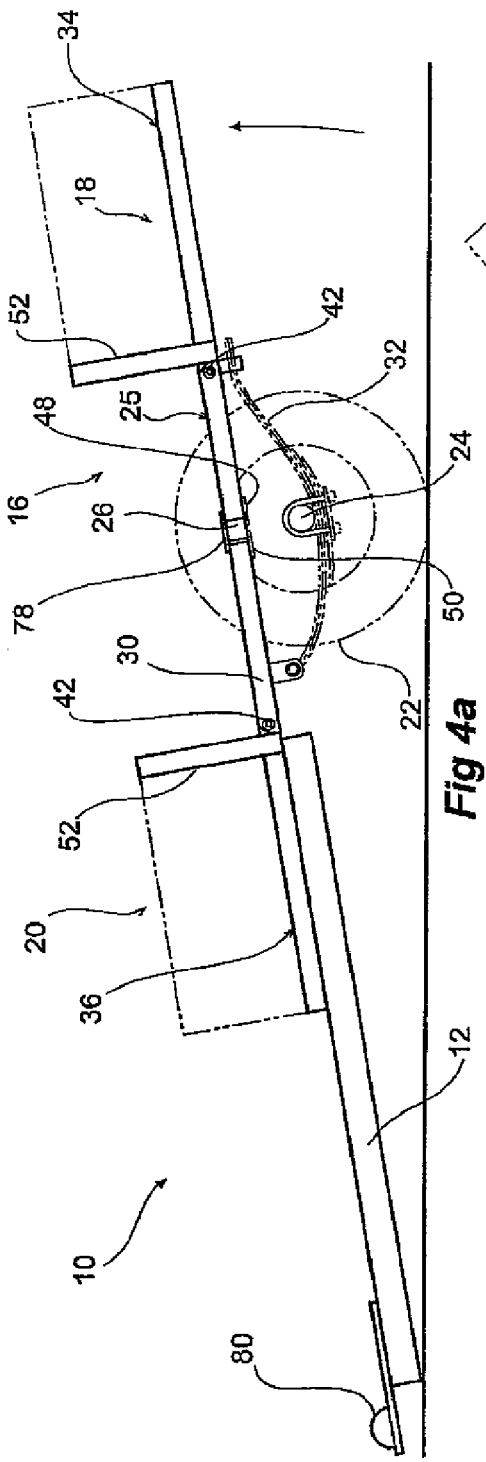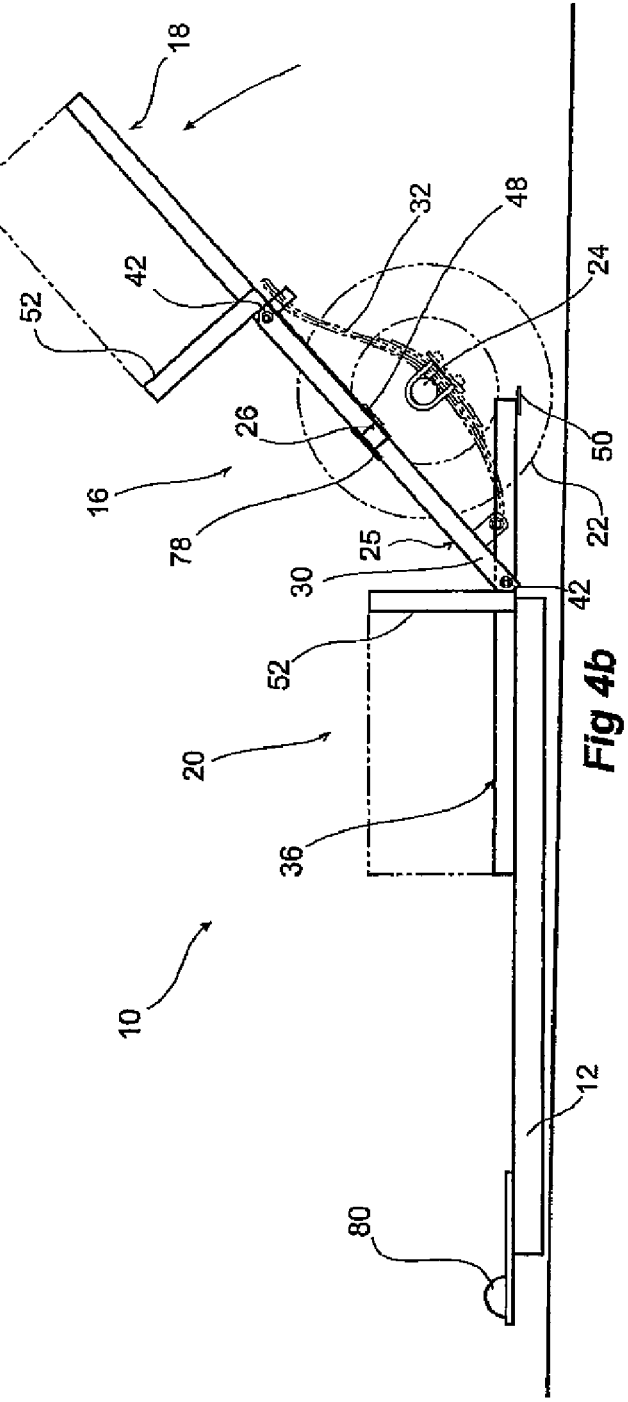

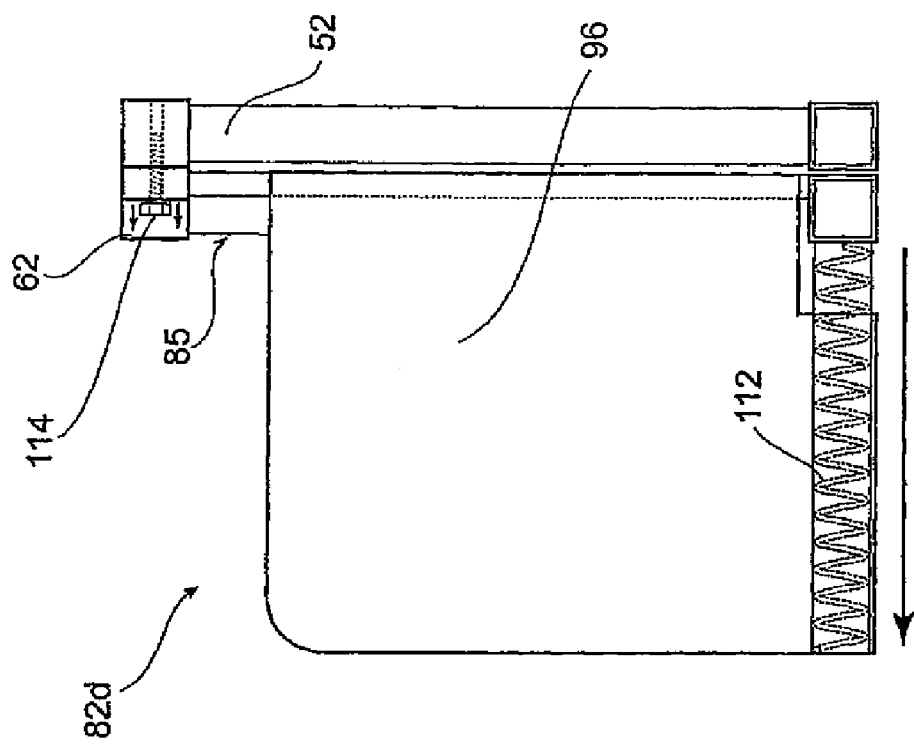
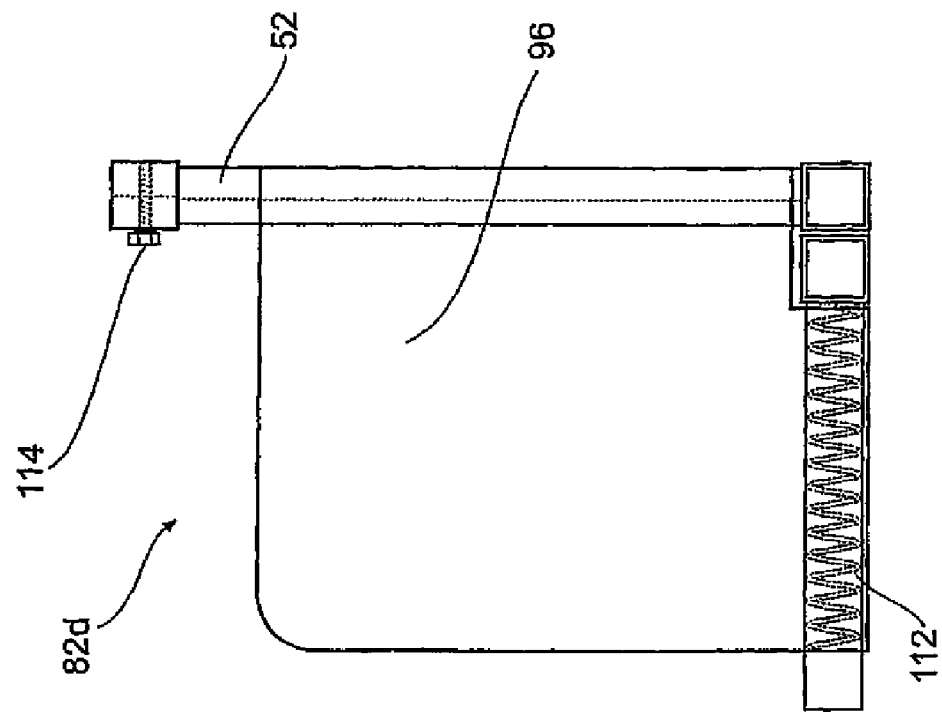

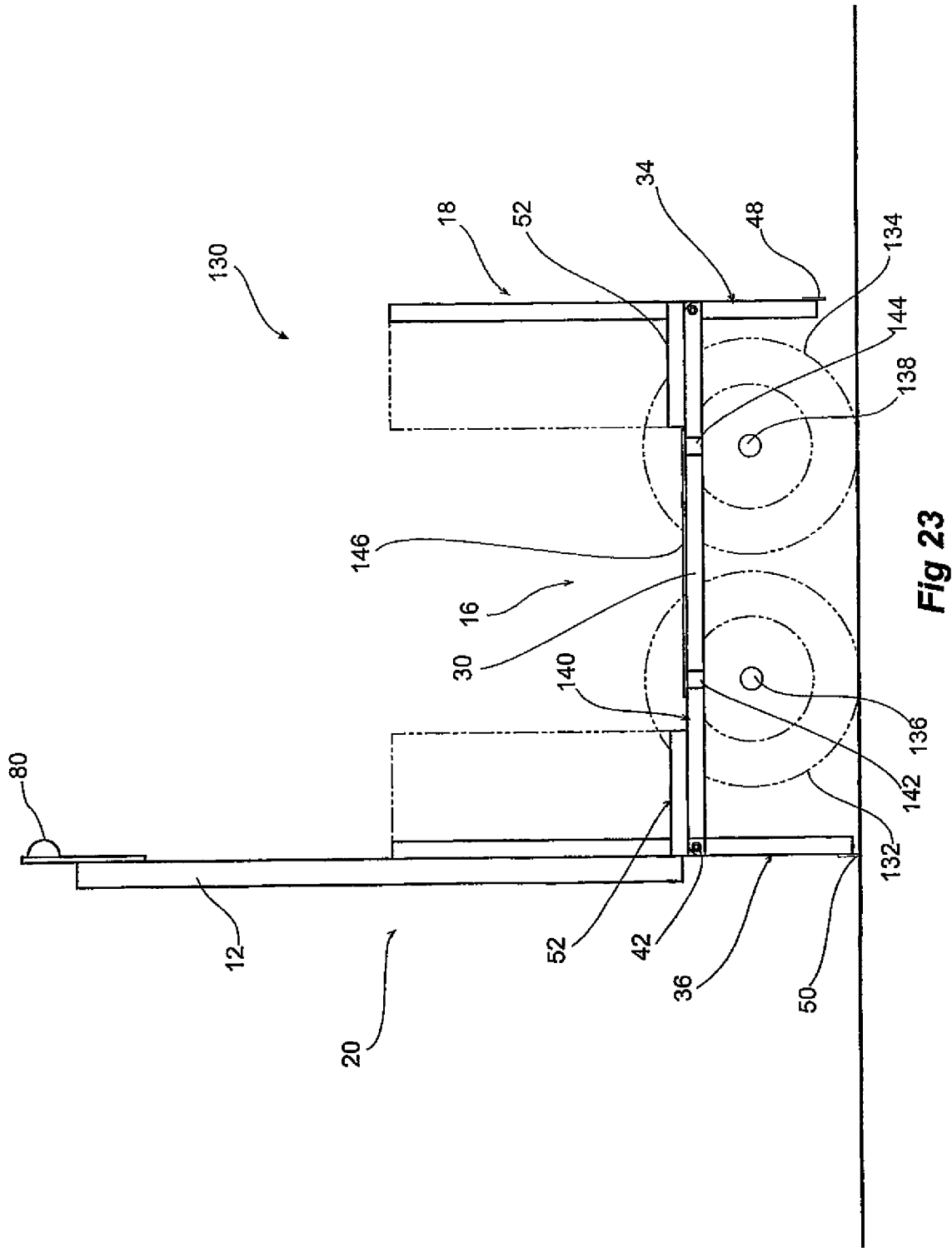

FOLDING TRAILER

The present invention relates to a folding trailer and, in particular, to a trailer that is adapted to be folded to a compact size for storage.

BACKGROUND OF THE INVENTION

Small trailers adapted to be attached to automobiles are well known, and are typically used both recreationally and industrially for transporting a variety of different goods. For example, such trailers may be used to haul small boats and motorcycles, as well as lawnmowers, building equipment and other miscellaneous items. In general, the dimensions of such trailers range from approximately 6' long×5' wide to 8' long× 5' wide, and may also include more than one wheel axle. It is to be understood that the principle behind the folding trailer of the present invention may well be applied to any appropriately sized trailer having one or more wheel axles.

The average homeowner will use a trailer infrequently. For example, a person may own a trailer solely for the purpose of transporting a motorbike or small boat to a holiday destination once every year. Accordingly, the trailer is required to be stored in a garage or other storage facility for the remainder of the year as it is not practical to have the trailer attached to an automobile at all times. Although the trailers are relatively small, they are large enough to be a storage nuisance for the average homeowner, this being particularly relevant in the current climate where homes are being built with little to no outdoor space.

There have also been various attempts at constructing trailers which are foldable from an expanded state to a compact state suitable for storage. However, there are a number of problems associated with existing folding trailers known to the applicant such as their complex folding/unfolding mechanisms, problems with stability when in the compact state, their excessive size when folded, the reliance on and excessive use of hinges to support various portions of the trailer, the common requirement for various parts to be removed prior to folding, and also for additional parts to be added after folding.

As a result of the abovementioned problems, people have generally relied on hiring or renting trailers when required, as opposed to purchasing them outright.

It is therefore an object of the present invention to overcome at least some of the aforementioned problems or to provide the public with a useful alternative.

SUMMARY OF THE INVENTION

Therefore in one form of the invention there is proposed a trailer of the type adapted to be folded from an expanded state to a compact state, said trailer characterised by:
at least one transverse wheel axle; and
a longitudinal chassis having a central chassis portion with pivot means at longitudinal ends thereof, said pivot means adapted to pivotably connect respective front and rear chassis portions to the central chassis portion so that when the trailer is in the expanded state, the front chassis portion, rear chassis portion and central chassis portion extend in a substantially horizontal plane, and when the trailer is in the compact state, the front chassis portion and rear chassis portion extend substantially perpendicularly to the central chassis portion wherein at least one of the front or rear chassis portions extends at least partially below the central chassis portion to thereby assist in stabilising the trailer in the compact state.

In a further form of the invention there is proposed a trailer of the type adapted to be folded from an expanded state to a compact state, said trailer characterised by:
at least one transverse wheel axle having associated therewith opposed wheels; and
a longitudinal chassis having a central chassis portion with pivot means at longitudinal ends thereof, said pivot means adapted to pivotably connect respective front and rear chassis portions to the central chassis portion so that when the trailer is in the expanded state, the front chassis portion, rear chassis portion and central chassis portion extend in a substantially horizontal plane, and when the trailer is in the compact state, the front chassis portion and rear chassis portion extend substantially perpendicularly to the central chassis portion wherein at least one of the front or rear chassis portions contacts a ground surface upon which the opposed wheels also rest to thereby assist in stabilising the trailer in the compact state.

Preferably the front chassis portion includes an A-frame mounted thereto used to removably attach the trailer to a vehicle.

In preference in the expanded state, a front end of each of the front and rear chassis portions extend a predetermined distance forwardly of their associated pivot means, and a rear end of each of the front and rear chassis portions a predetermined distance rearwardly of their associated pivot means.

In preference said trailer further includes a first retaining means for preventing upward rotation of the front end of the rear chassis portion and rear end of the front chassis portion, and a second retaining means for preventing upward rotation of the rear end of the rear chassis portion and front end of the front chassis portion.

Preferably the first retaining means is in the form of a transverse cross-beam associated with the central chassis portion.

Preferably each of the front and rear chassis portions includes at least one respective upright projection, and wherein said second retaining means is in the form of a moveable insert which serves to maintain respective front and rear projections in a spaced apart relationship.

In preference the moveable insert forms part of a side wall of the trailer, the side wall being associated with the central chassis portion such that it is moveable with respect thereto from a first position in which said insert is positioned between the respective front and rear projections, and a second position in which it is not.

In preference the side walls are pivotably associated with the central chassis portion.

In an alternate configuration the side walls are threadably associated with the central chassis portion.

In a further alternate configuration, the side walls may be associated with the central chassis portion by way of a lever mechanism.

In a still further alternate configuration, the side walls may be associated with the central chassis portion by way of a crank mechanism, rack and pinion mechanism, or spring mechanism.

Preferably the trailer includes a single wheel axle, in which the wheel axle is suspended directly below the transverse cross member of said central chassis portion.

In preference the trailer includes a single wheel axle in which the wheel axle is suspended directly below the transverse cross member of said central chassis portion, and wherein said single wheel axle and said trailer transverse cross member are offset from a centre of the chassis, so that when the trailer is in the compact state, the rear end of the front chassis portion extends a greater distance below the wheel axle than the front end of the rear chassis portion, to thereby contact the ground surface and stabilise the trailer.

Alternatively the single wheel axle is rearwardly offset from the centre of the chassis, and the transverse cross member is positioned at the centre of the chassis, so that when the trailer is in the compact state, the rear end of the front chassis and the front end of the rear chassis extend an equal distance below the wheel axle to a point adjacent the ground surface to thereby stabilise the trailer in the compact state.

In preference the rear end of the front chassis portion and the front end of the rear chassis portion include respective castor wheels positioned to elevate the trailer when in the compact state to thereby assist in moving the compact trailer upon the castor wheels.

Preferably the front chassis portion, rear chassis portion, and central chassis portion include respective trays mounted there above such that when the trailer is in the expanded state, the trays become aligned substantially parallel with the horizontal plane to thereby form a single flush surface upon which items may be carried.

Preferably the front chassis portion includes a front wall and front chassis side walls, and the rear chassis portion includes an accessible rear wall and rear chassis side walls, whereby each wall extends substantially upright from the corresponding chassis portions.

Preferably the front and rear upright projections are associated with the front chassis side walls and rear chassis side walls respectively.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings:

FIG. 3a illustrates an enlarged side view of a side wall of the central chassis portion of the trailer of FIG. 2 when in a closed position;

FIG. 3b illustrates an enlarged side view of the side wall flap of FIG. 3a being opened from the closed position to a fully open position indicated in broken lines, thereby allowing rotation of the front and rear chassis elements;

FIG. 4a illustrates a side view of the folding trailer of FIG. 2 whereby the rear chassis portion of the trailer is lifted causing the front chassis portion to pivot, this being the second step in folding the trailer;

FIG. 4b illustrates a side view of the folding trailer of FIG. 2 whereby the rear chassis portion has been lifted to such an extent that the A-frame associated with the front chassis portion rests horizontally along the ground, this completing the second step in folding the trailer;

FIG. 17a illustrates a side view of a still further alternately configured side wall when in the closed position, whereby movement of the wall is actuated using a spring mechanism;

FIG. 17b illustrates a side view of the side wall of FIG. 17a when in the open position;

FIG. 23 illustrates a side view of the folding trailer of FIG. 22, the trailer being shown in a compact state.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention relates to a folding trailer according to three alternate embodiments 10, 120 and 130, the trailers being of the type commonly used to transport goods when the A-frame or draw bar 12 of the trailer 10 is attached to the rear of an automobile (not shown). The trailer 10 according to a first embodiment is shown in FIGS. 1-17, the trailer 120 according to a second embodiment shown in FIGS. 18-21, and the trailer according to a third embodiment shown in FIGS. 22-23.

Figure 1:
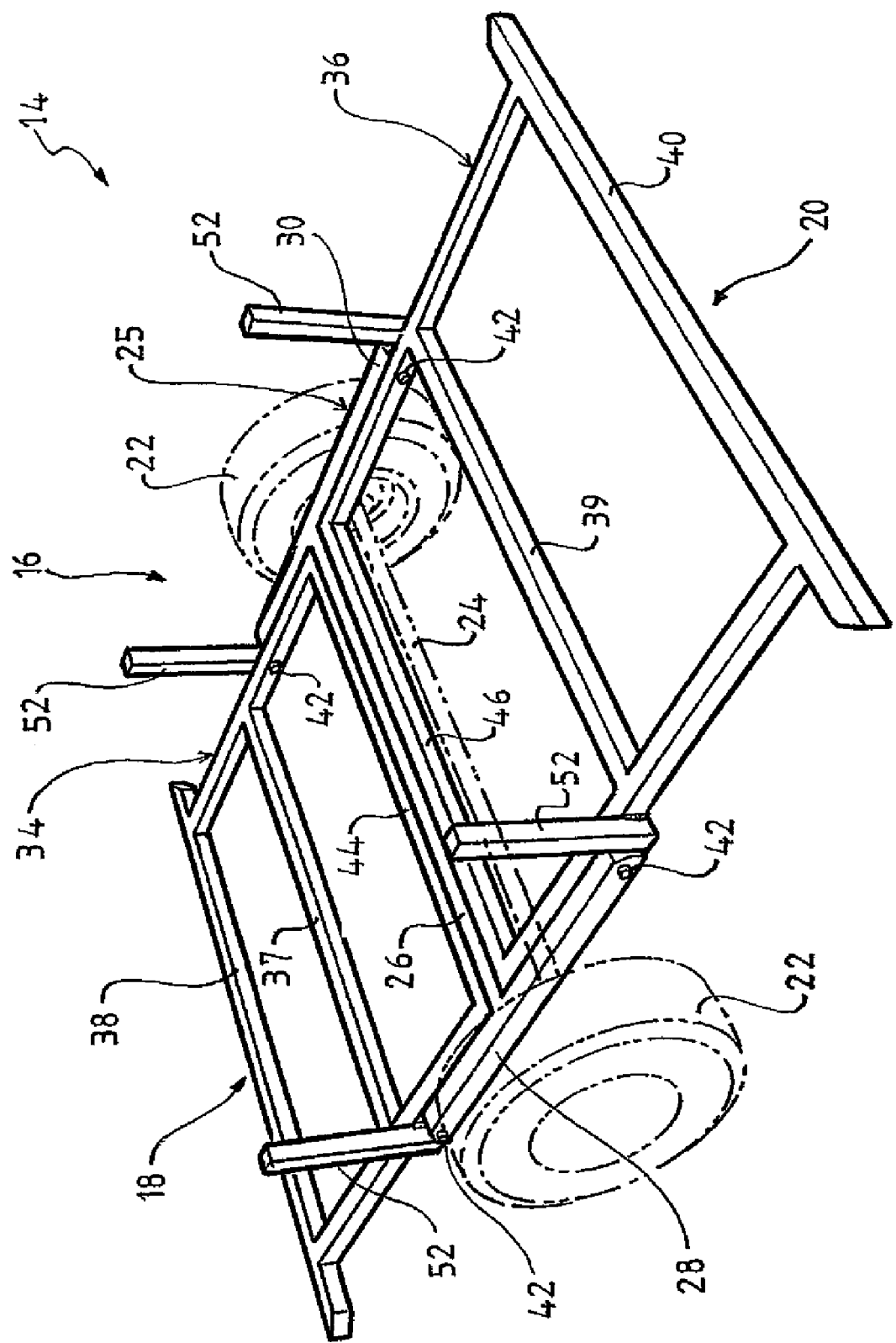
FIG. 1 illustrates a perspective view of a chassis for a folding trailer according to a first embodiment of the present invention.
Figure 2:
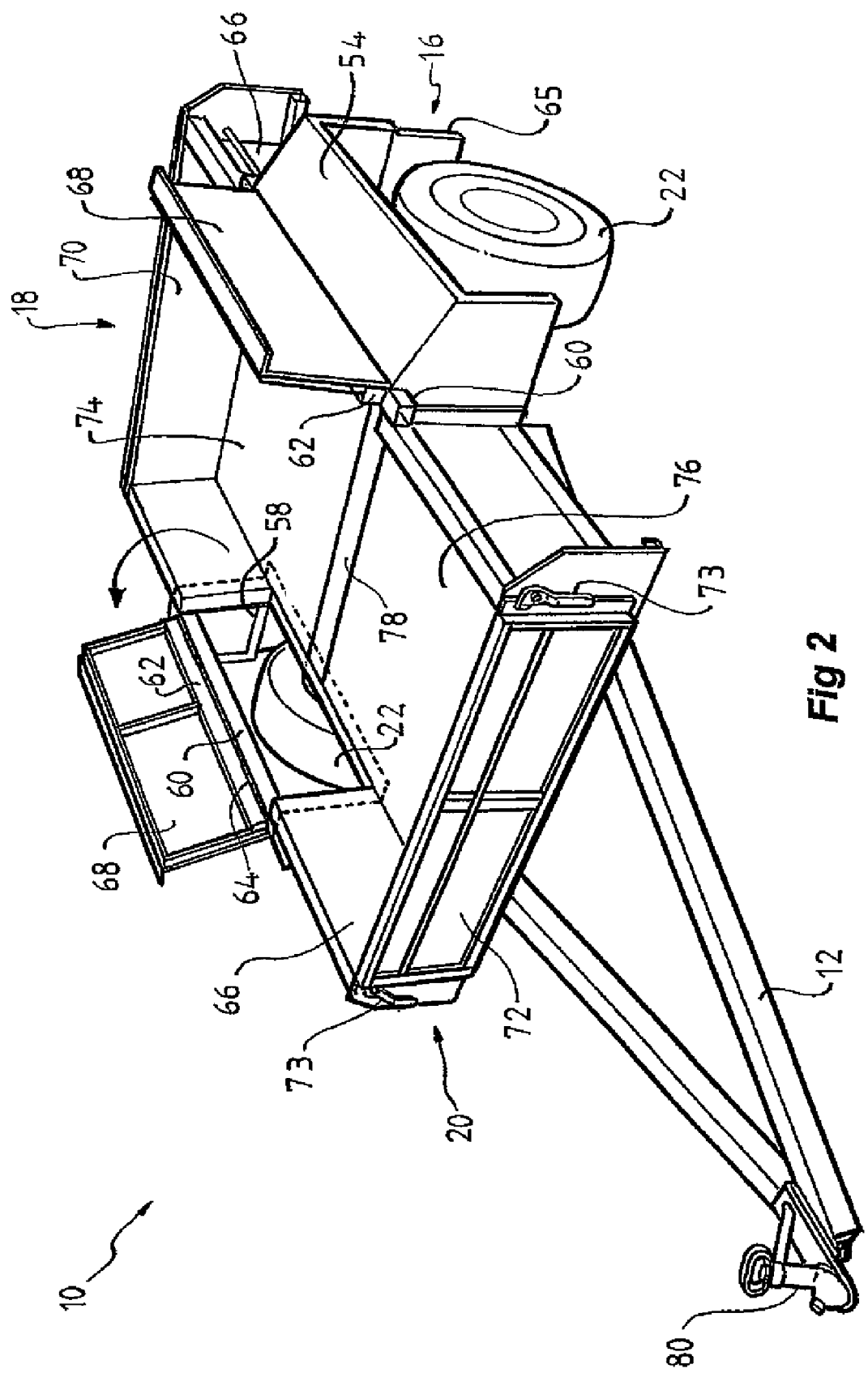
FIG. 2 illustrates a perspective view of an assembled folding trailer whereby the side walls of the central chassis portion of the trailer have been rotated to an open position, this being the first step in folding the trailer.

FIG. 1 illustrates a folding trailer chassis 14 in its most basic form including a central chassis portion 16, a pivotable rear chassis portion 18, a pivotable front chassis portion 20, and two wheels 22 connected by a wheel axle 24.

The chassis 25 of the central portion 16 comprises a transverse cross member 26 in connection with two side members 28 and 30 extending longitudinally at opposed ends thereof. The cross member 26 is rearwardly offset from the centre of the chassis 14. The wheel axle 24 extends directly beneath the cross member 26 and is suspended from both side members 28 and 30 of the central portion 16 through respective spring leaf suspension systems 32. This type of suspension system 32 is common to most utility trailers and will therefore not be described here in any detail. It is to be understood that alternate suspension systems may equally well be used.

The way in which the pivotable rear portion 18 and pivotable front portion 20 interact with the central portion 16 is key to the working of the invention. The pivotable rear portion 18 and pivotable front portion 20 include substantially rectangular chasses 34 and 36 respectively having internal transverse reinforcing members 37 and 39 respectively. As can be seen in FIG. 1, each chassis 34 and 36 is of a width to be received between the side members 28 and 30 of the central portion 16. Also, the trailing edge 38 of the rear chassis 34 and leading edge 40 of the front chassis 36 extend a short distance transversely beyond the respective chassis sides for mounting purposes.

Extending transversely through each opposed longitudinal end of the side members 28 and 30 are pins 42 which constitute the front and rear pivot means of the trailer. The chasses 34 and 36 are pivotably mounted to the side members 28 and 30 through pins 42 which allow them to rotate relative to the central portion 16. The mounting position of each chassis 34 and 36 between the side members 28 and 30 is such that when they and the central portion chassis 25 are aligned in the same horizontal plane, as is shown in FIG. 1, the leading edge 44 of the rear chassis 34 and trailing edge 46 of the front chassis 36 extend parallel to and adjacent the cross member 26. It is to be understood that the present invention should not be limited to the use of pins 42 as a means of pivoting the front and rear chasses 34 and 36, as any other appropriate pivoting means is suitable.

As those skilled in the art would realise, when the trailer 10 is in use, the pivotable front and rear chasses 34 and 36 should be prevented from rotating about their respective pivot points. This is to ensure that a flat bed is maintained within the trailer 10a when in use. Accordingly, the trailer includes retaining means to prevent rotation of the front and rear chassis portions in clockwise and anticlockwise directions. Mounted to the lower surface of each of the chassis edges 44 and 46 is a respective lip 48 and 50 extending therealong. The lips 48 and 50 are each adapted to abut with the lower surface of the cross member 26, which constitutes the first retaining means, when forced to rotate upwardly. When the lips 48 and 50 are each in abutment with the cross member 26, the three adjacent members 44, 26 and 46 are aligned to four a substantially flush upper surface. The exact configuration of the lips 48 and 50 can be seen clearly in the latter Figures.

Also forming part of the front and rear chasses 34 and 36 are four upright posts which for the purposes of is description will each be referred to by the single reference number 52. Each chassis 34 and 36 includes two opposed and transversely aligned upright posts 52 mounted to their outer surfaces adjacent each longitudinal end of the side members 28 and 30. The upright posts 52 are an important component in the trailer 10 because where lips 48 and 50 prevent the front and rear chasses 36 and 34 from rotating in one direction, the upright posts 52 are used to prevent the front and rear chasses 36 and 34 from rotating in the opposite direction. Those skilled in the art would realise that in order to prevent such rotation, the upright posts 52 must be maintained at the spaced apart distance shown in FIG. 1. The method by which this is achieved will become evident below. Also, the longitudinal end points of each side member 28 and 30 is rounded to allow for rotation of the upright posts 52 when either of the front or rear chasses is rotated.

FIGS. 2-11 illustrate the steps by which a fully assembled trailer 10 may be folded from an unfolded workable position to a compact folded position for storage.

Before describing the steps by which the trailer 10 is folded, further features of the trailer 10 will first be described. The central chassis portion 16 of the trailer 10 includes side wheel guards 54 extending above and partially over the sides of each wheel 22. The side wheel guards 54 are supported above side wheel guard supports 56 which are mounted onto the outer sides of each side member 28 and 30. These can be seen clearly in FIGS. 3a-3b. Each side wheel guard support 56 comprises two longitudinally spaced apart and outwardly extending L-shaped members 58 joined at their upper ends via a connecting beam 60.

As well as providing a mounting for the wheel guards 54, the wheel guard supports 56 also serve to prevent the front and rear chasses from rotating when the trailer 10a is to be used. It achieves this by maintaining the abovementioned distance between each longitudinally aligned upright post 52 through the use of a separating member or insert 62, constituting the second retaining means, and attached to the connecting beam 60 through hinges 64. The separating member 62 is moveable between a first position in which it is positioned inwards from the connecting beam 60 to ensure that the longitudinally spaced apart upright posts 52 are maintained separated, and a second position (indicated in dotted lines in FIG. 3b) in which the separating member 62 is located above the connecting beam 60 to thereby allow for rotation of the front and rear chasses 36 and 34. The separating member 62 may be incorporated into the trailer 10a a number of different ways, as will be appreciated when viewing further configurations of the side walls in FIGS. 11-17.

Further features of the trailer 10 include mud guards 65, fixed side walls 66, side wall flaps 68 mounted to the hinged separating members 62, and a rear wall 70 and front wall 72, bot of which are accessible when their corresponding latches 73 are opened. The trailer bed is made up of flat rectangular sheets 74 and 76 attached to the upper surface of chasses 34 and 36 respectively. A transversely extending panel 78 is mounted across the central portion cross member 26 to cover the edges 44 and 46 of the chasses 34 and 36 respectively for the purpose of maintaining a flat surface in the trailer bed when in use. Otherwise, as those skilled in the art would realise, materials such as gravel (not shown) held within the trailer may fall between the adjacent members 44, 26 and 46. The A-frame 12 of the trailer 10 has an attachment device 80 for mounting to an automobile (not shown), and is fixedly attached to the front chassis 36.

The following description relates to how the trailer 10 is folded from an expanded state in which it is adapted to be attached to the rear of an automobile, to a compact state in which the overall size of the trailer 10 has been significantly reduced so that it may be stored.

The first step in folding the trailer 10 is to simply lift or rotate both side wall flaps 68 upwards. More specifically, one must rotate the separating members 68 until they are in a position whereby they no longer separate the longitudinally aligned upright posts 52 so that the chasses 34 and 36 are free to rotate. This illustrations relating to this first step are FIGS. 2, 3a and 3b.

Figure 5:
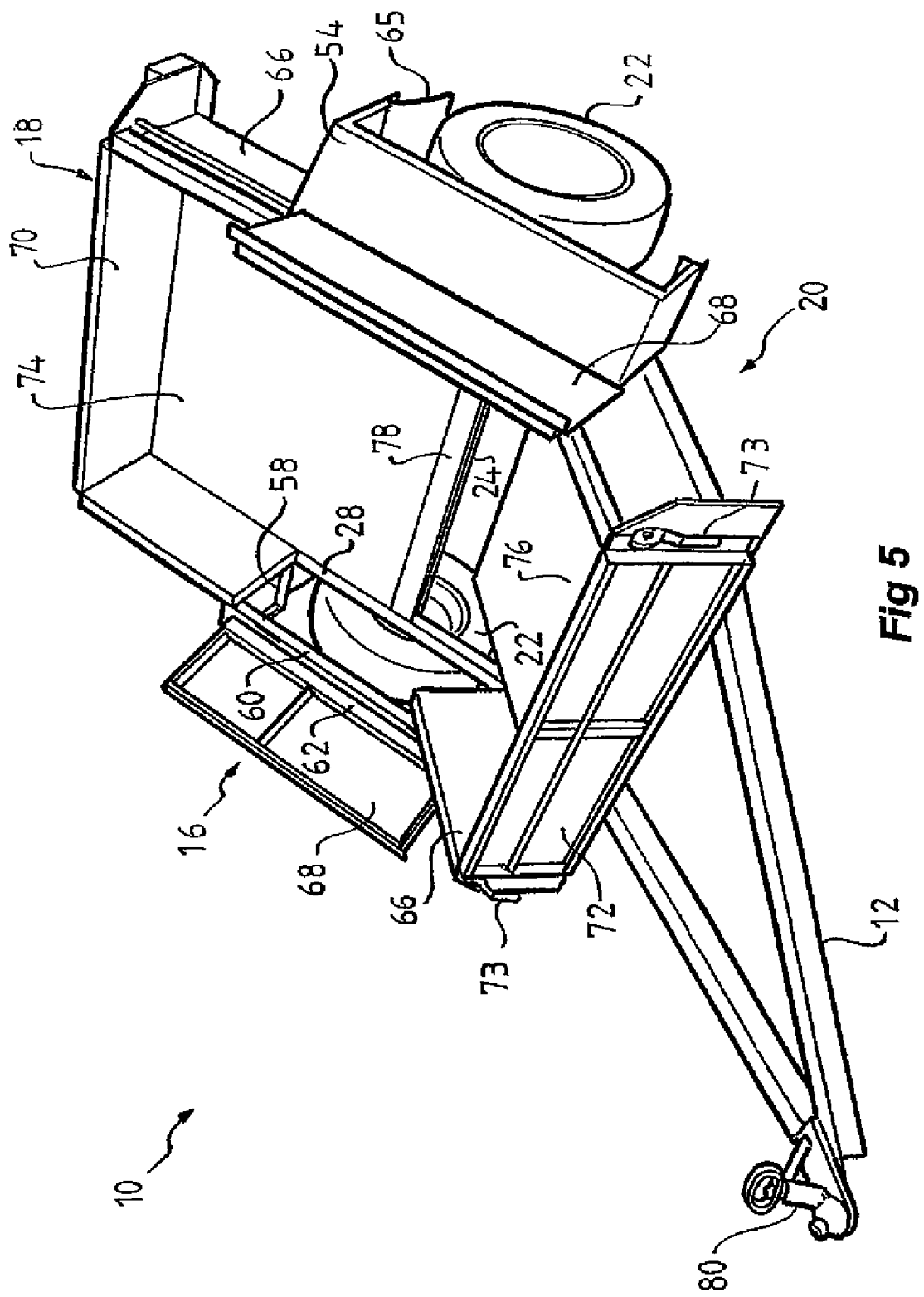
FIG. 5 illustrates a perspective view of the folding trailer as shown in FIG. 4b.
Figure 6:
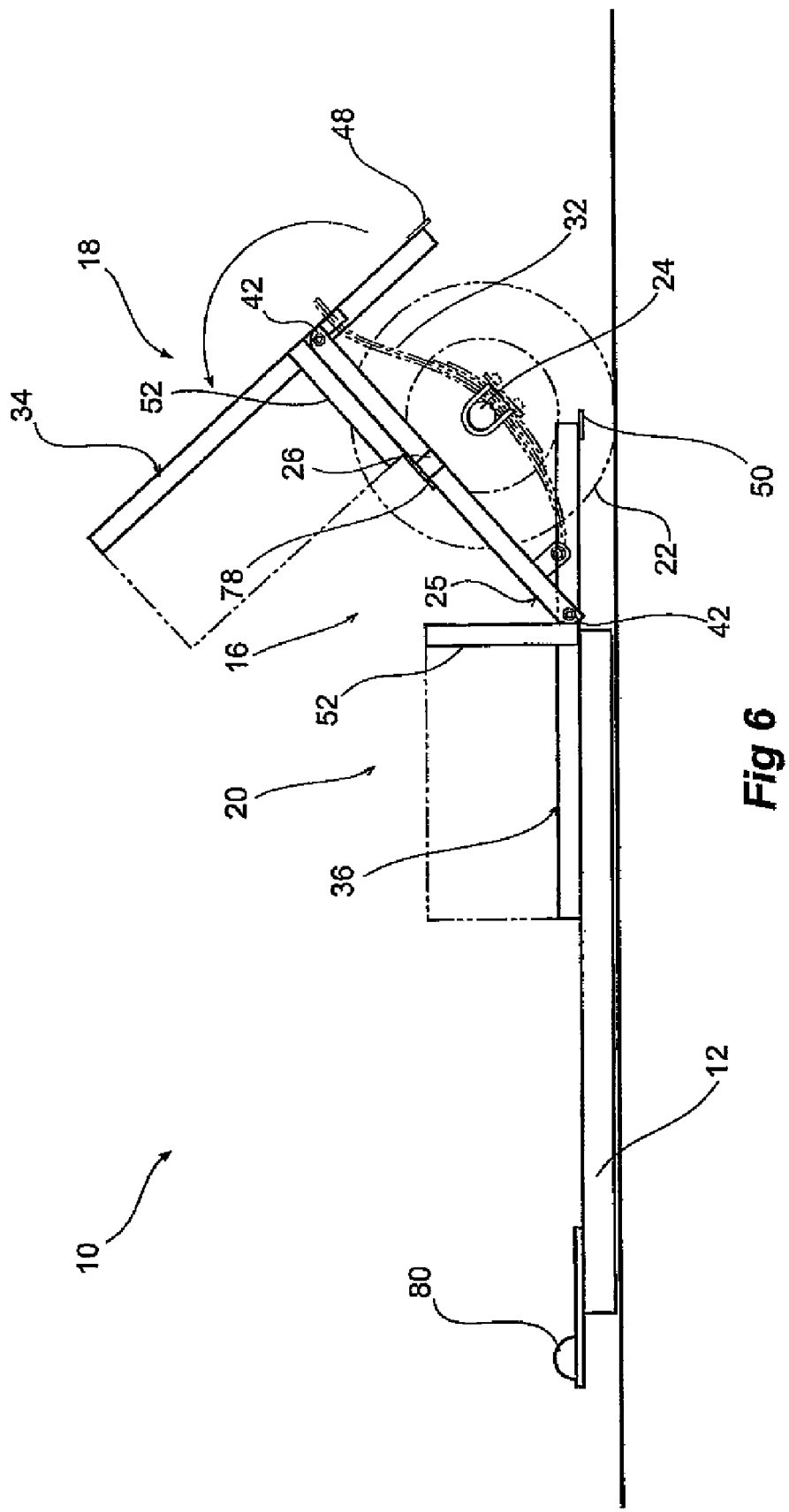
FIG. 6 illustrates a side view of the folding trailer of FIG. 2 whereby the rear chassis portion has been rotated about the rear pivot means by 90 degrees toward the front of the trailer, this being the third step in folding the trailer.

Referring now to FIGS. 4-6, the second step in folding the trailer 10 involves simply lifting the pivotable rear chassis portion 18 of the trailer 10 to thereby cause the front chassis portion 36 to pivot. One would then continue to lift the rear portion 18 until the draw bar and front chassis portion 36 are resting on the ground. When in this position, the central chassis 25 is at an angle of approximately 45 degrees and due to the weight of the draw bar 12, this position may be maintained without any further manual effort.

Figure 7:
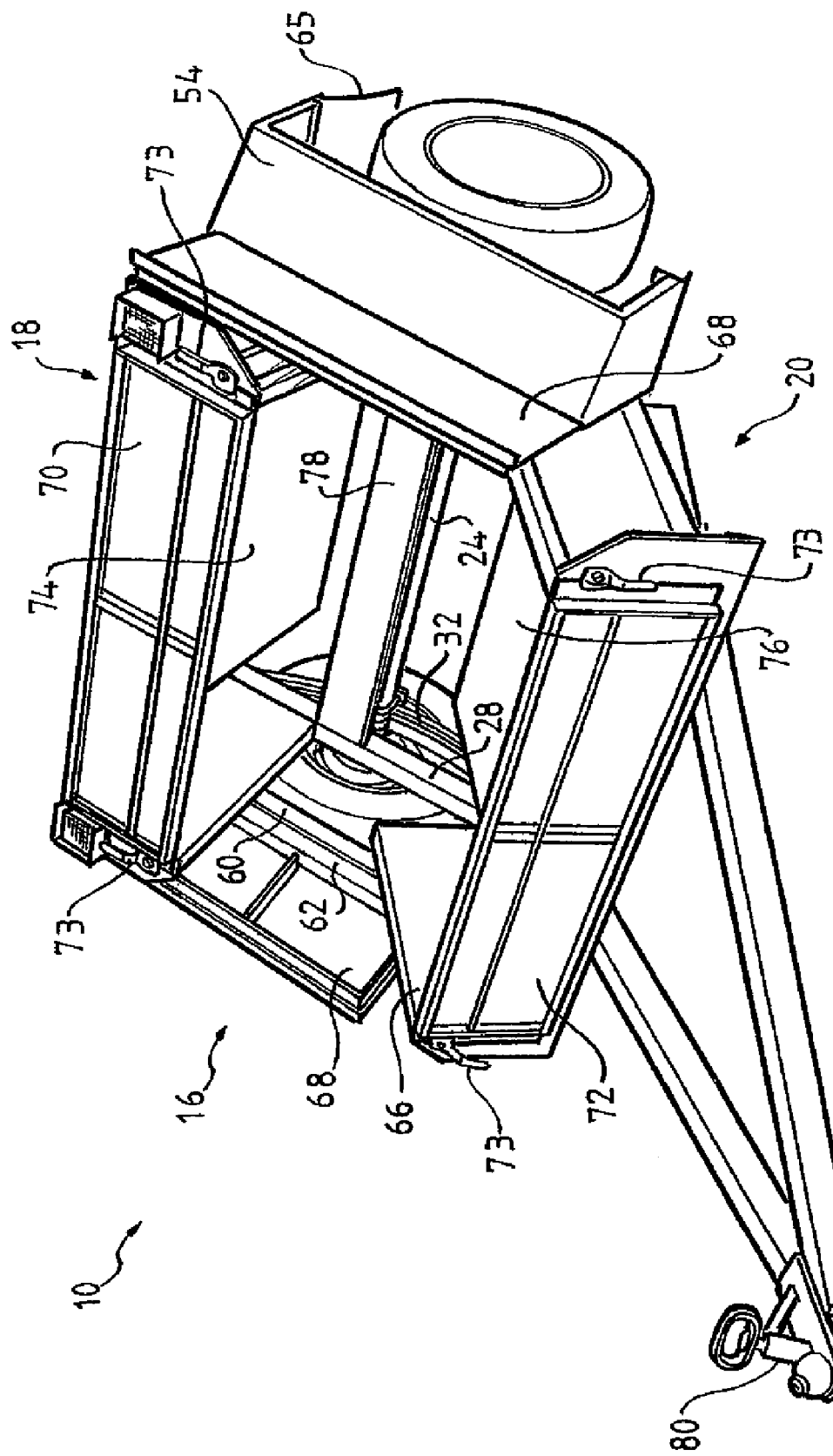
FIG. 7 illustrates a perspective view of the folding trailer as shown in FIG. 6.
Figure 8:
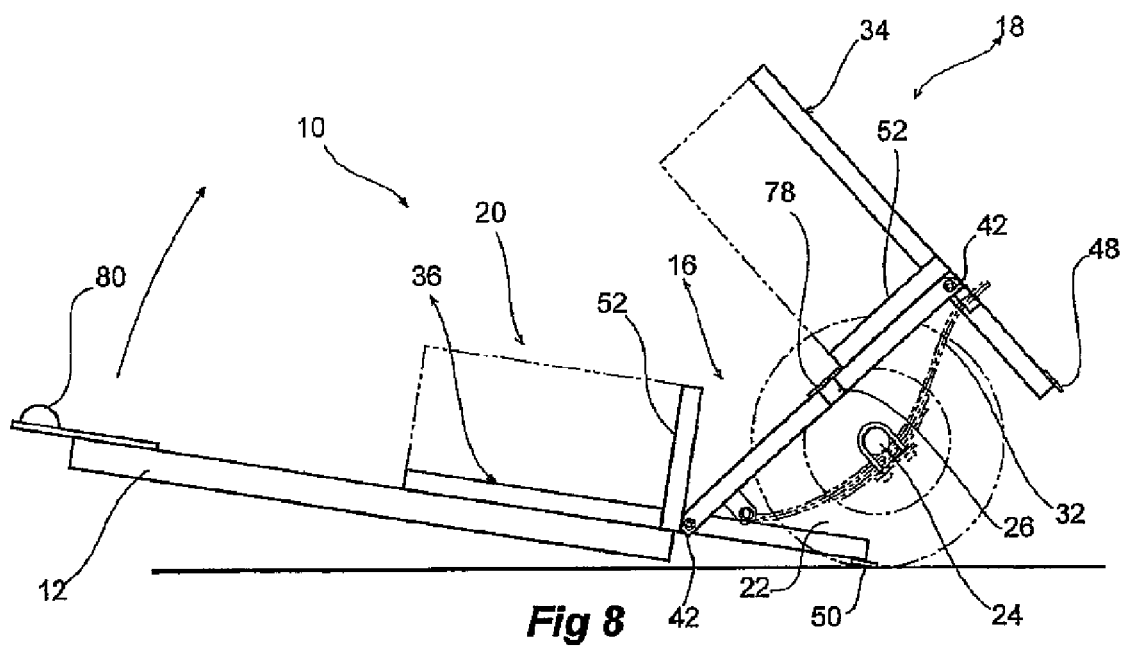
FIG. 8 illustrates a side view of the folding trailer of FIG. 2 whereby the A-frame associated with the front chassis portion of the trailer is rotated toward the rear of the trailer, this commencing the fourth and final step in folding the trailer.

The third step in the process of folding the trailer 10 is shown in FIGS. 6-7 and simply involves rotating the pivotable rear chassis portion 18 of the trailer 10 so that the rear chassis 34 pivots. The rear chassis 34 will be able to be rotated approximately 90 degrees until its upright posts 52 abut with the side members 28 and 30 of the central chassis 25.

Figure 9:
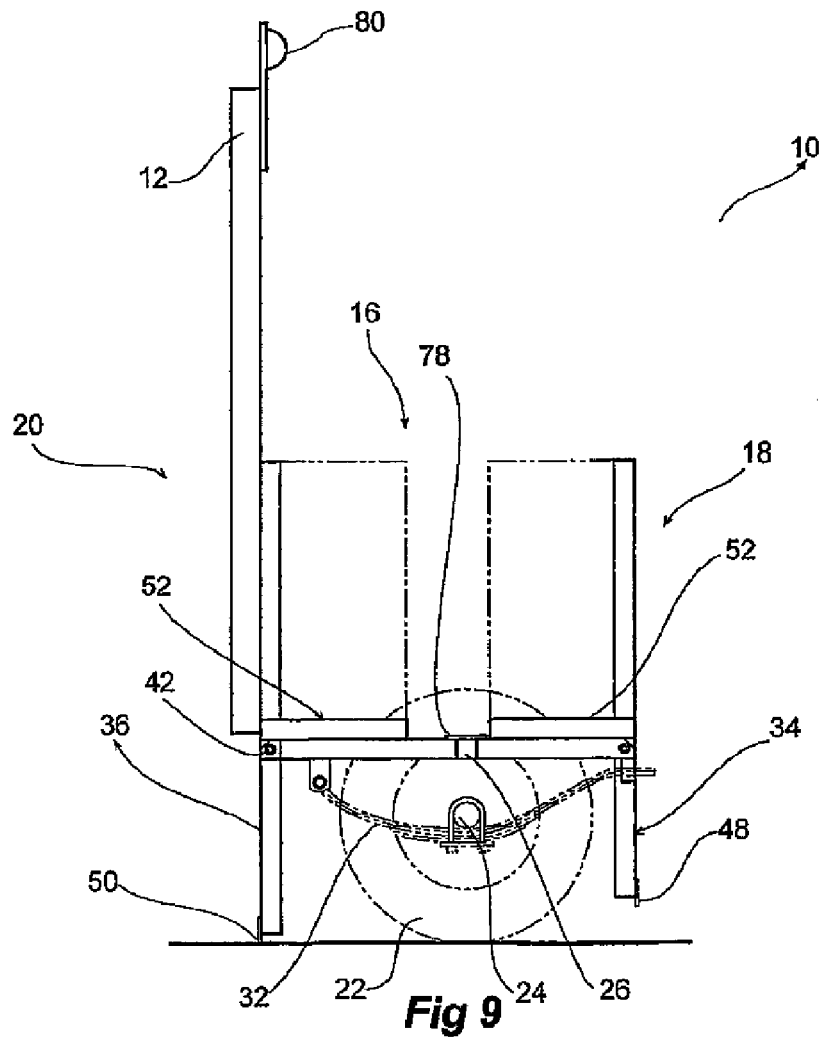
FIG. 9 illustrates a side view of the folding trailer of FIG. 2 whereby the A-frame of the trailer has been fully rotated towards the rear of the trailer, this completing the fourth and final step in folding the trailer.
Figure 10:
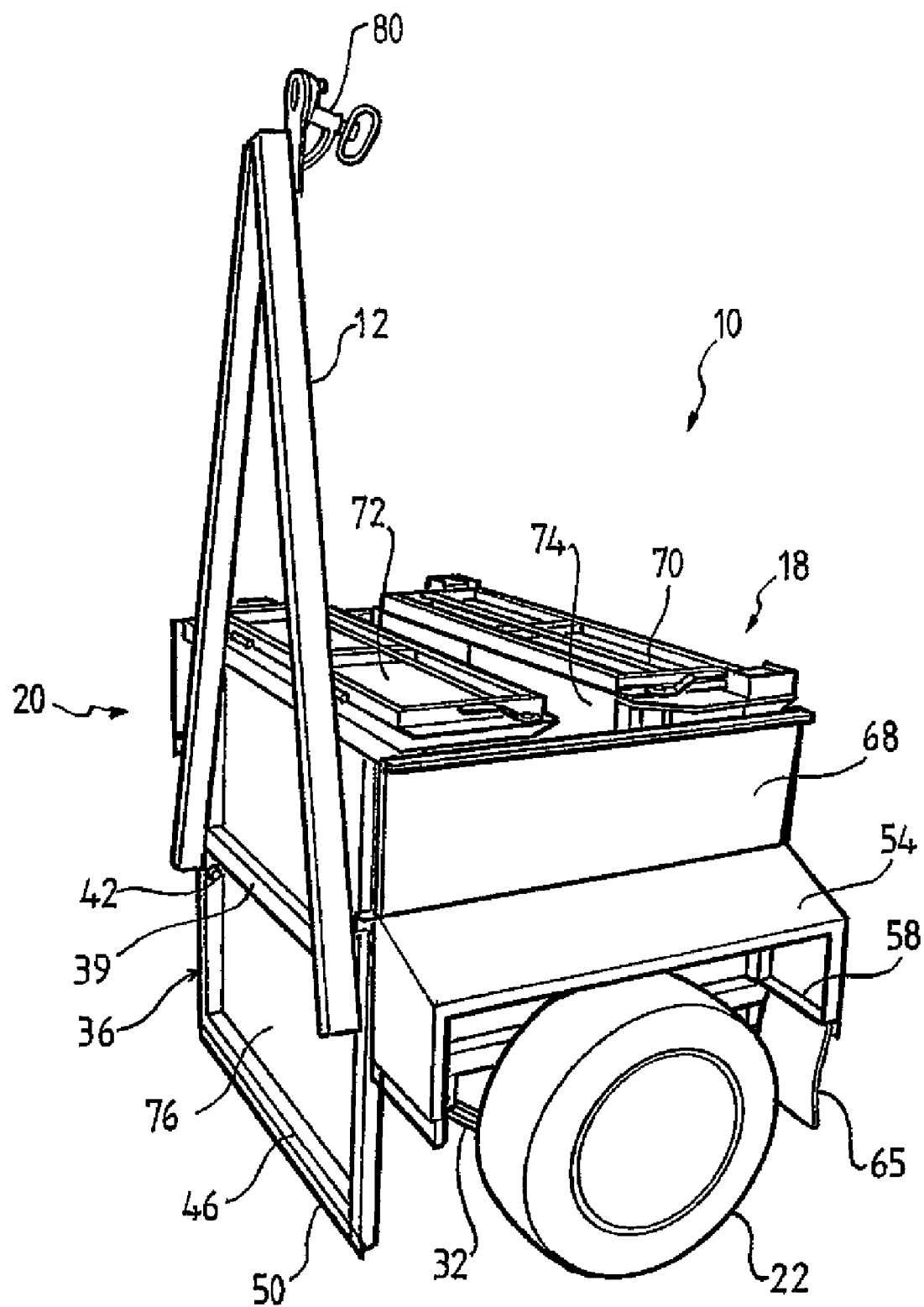
FIG. 10 illustrates a perspective view of the folding trailer as shown in FIG. 9.
Figure 11:
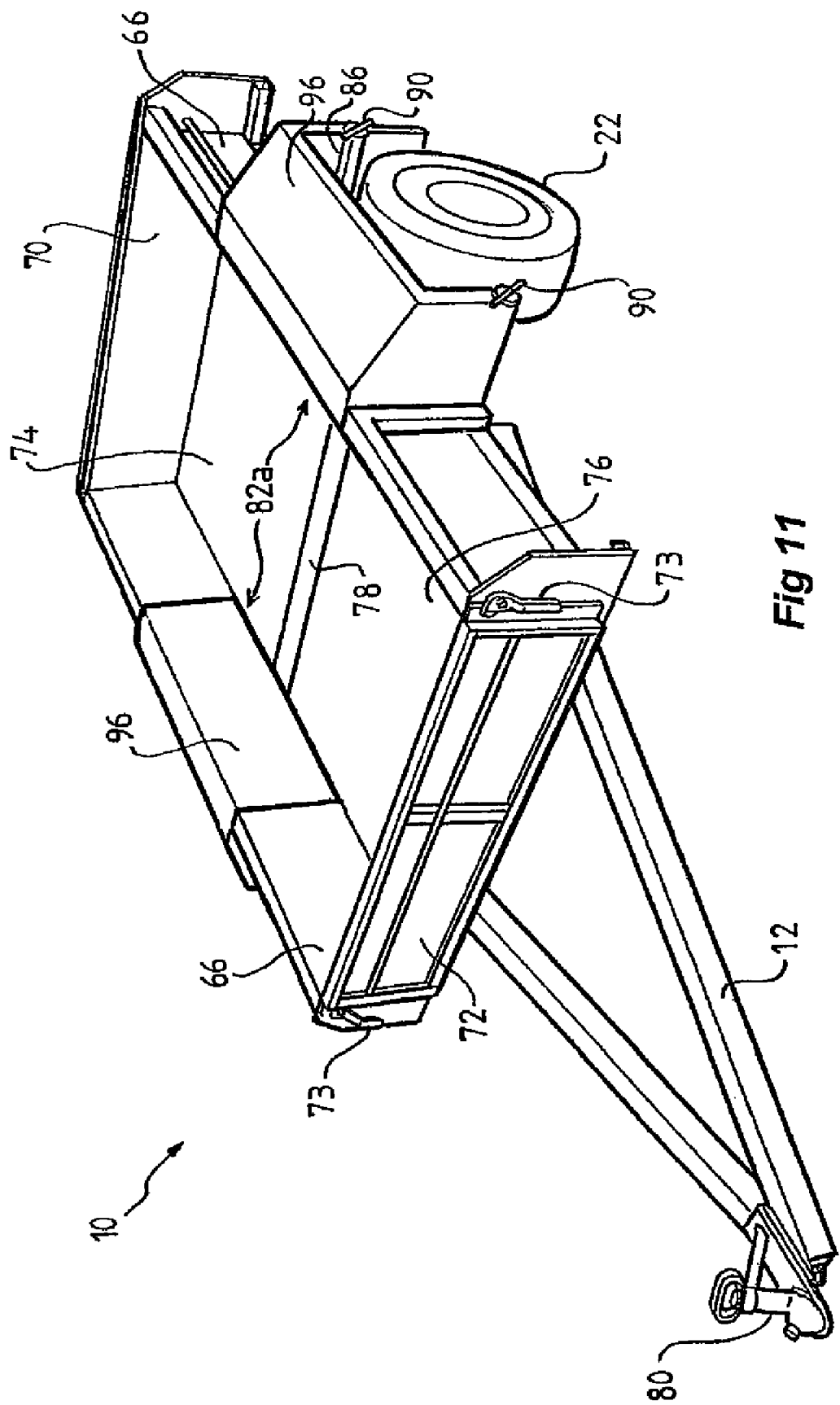
FIG. 11 illustrates a perspective view of a folding trailer including alternately configured side walls associated with the central chassis portion of the trailer, the trailer being shown in a fully expanded state.

Illustrated in FIGS. 9-11 is the final step in folding the trailer 10. This involves lining the draw bar 12 of the trailer 10 until the front chassis 36 is completely pivoted, that is, until the upright posts 52 of the front chassis 36 abut with the side members 28 and 30 of the central chassis 25. When this process is complete, the front and rear chasses 34 and 36 are both maintained parallel to one another and perpendicularly to the central chassis 25 and the ground. The folded trailer 10 is balanced on its wheels 22 and the lip 50 of the front chassis portion 36.

As those skilled in the art would realise, the rear chassis portion 34 does not extend to the ground because the position of the rearwardly disposed cross member 26 requires that the length of the rear chassis 34 be shorter. This configuration allows one to wheel around the trailer 10a when in the folded position by simply tilting it toward the rear chassis 34 until it is balanced on the wheels 22. Although not shown, detachable or foldable jockey wheels (not shown) may be attached to the front chassis 34 adjacent lip 50.

The trailer 10, as well as the other trailers embodied herein, may include locking arrangements (not shown) for maintaining the trailer 10a in its expanded or compact state. For example, when in the expanded state, in order to ensure the side walls 68 and hence the separating member 62 do not shift out of position, cam locks (not shown) may be used to secure the side walls 66 associated with the front and rear chassis portions with the side wall 68 associated with the central chassis portion. A cam lock (not shown) similar to those used to secure shipping containers could also be used for example.

The benefits of the present invention should now be obvious. The folding trailer 10 is foldable to a very compact unit that is easily moveable and storable. The folding procedure as described above involves four simple steps and no parts of the trailer 10 are required to be removed prior to folding. Further, no additional parts are required to be added to the trailer 10 such as balancing arms or the like. The fact that the front and rear chassis portions extend below the central chassis portion assists the trailer in balancing when in the compact state.

Figure 12:
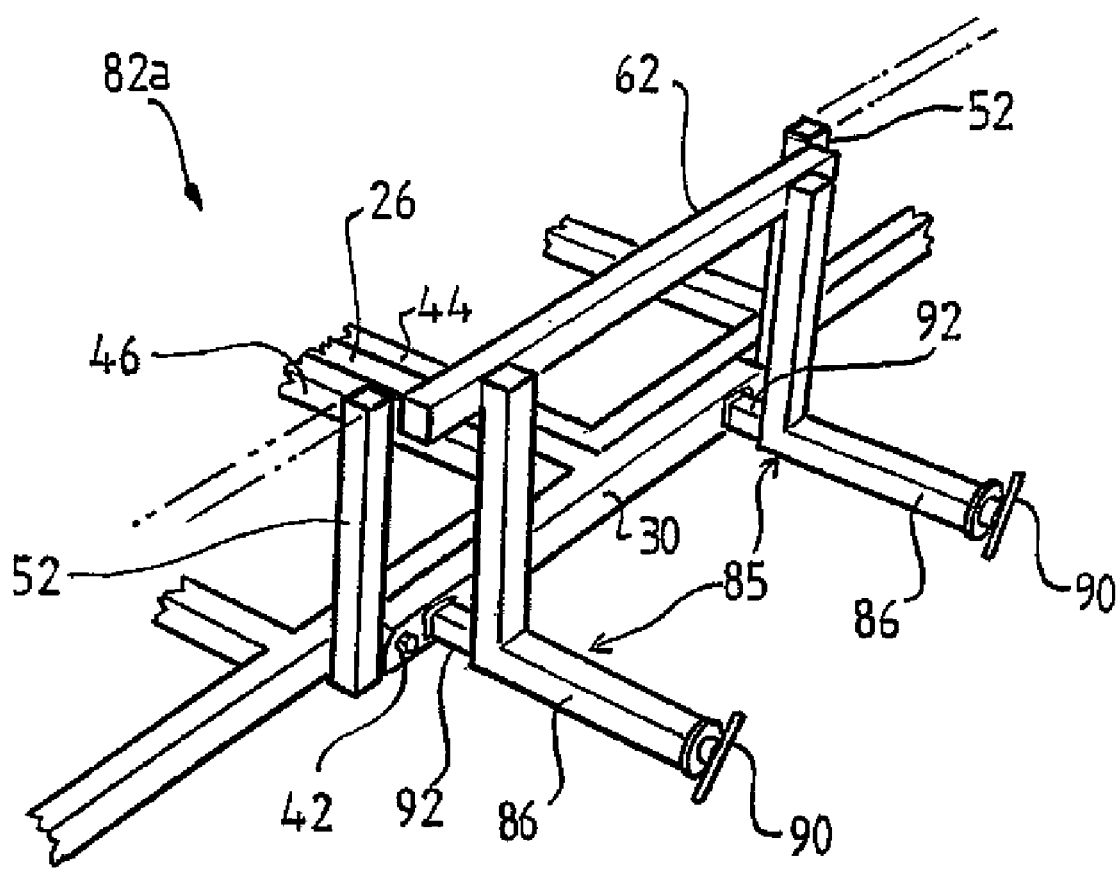
FIG. 12 illustrates an enlarged perspective view of a side wall of FIG. 11, when in an open position.
Figure 13:
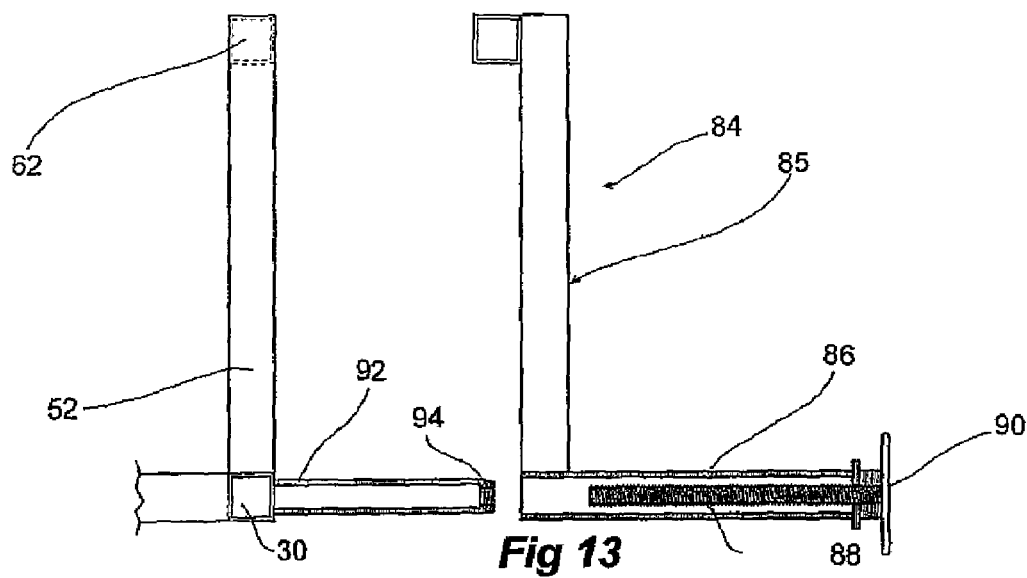
FIG. 13 illustrates an exploded side view of the side wall of FIG. 12.

As mentioned earlier, there may be various means by which the insert 62 may be moved to enable rotation of the upright beams 52 associated with each of the front 20 and rear 18 chassis portions. FIGS. 12-14 demonstrate a first alternate system 82a of achieving this. Further systems 82b, 82c and 82d are also described with reference to FIGS. 15-17 where like parts in the systems are referred to using like numbers. Although not shown, it is to be understood that the insert 62 may simply be removable.

The system 82a again involves the use of a side wheel guard support 84 which is mounted onto the outer side of each side member 28 and 30. Each side wheel guard support 84 comprises two longitudinally spaced apart and outwardly extending L-shaped members 85. Although in this instance there is not shown a connecting beam, one may well be included. The major difference however is the fact that instead of the separating member 62 being hinged to the wheel guard supports 84, they are simply welded at the first position (the separating position) described previously with respect to trailer 10. Thus, this embodiment provides for a method of moving the separating member 62 without the use of hinges.

Each of the base portions 86 of the L-shaped members 85 includes a threaded pin 88 connected to the outer end of each base portion 86 and is prevented from all movement except rotation within the base portion 86. The threaded pins 88 are rotatable by simply turning handle 90. Extending outwardly from each central chassis side member 28 and 30 are two mounting rods 92 which are longitudinally spaced apart approximately the same distance as the L-shaped members 85 of each side wheel guard support 84. Each mounting rod 92 includes a female threaded section 94 at outer ends thereof and are of stepped down cross section to the base portions 86. The base portions 86 of each L-shaped member 85 is thus configured to receive a corresponding mounting rod 92 until the female threaded sections 94 contact the threaded pins 88. When this occurs, one must simply turn the handles 90 so that the threaded pins 88 engage the female threaded sections 94.

Figure 14A:
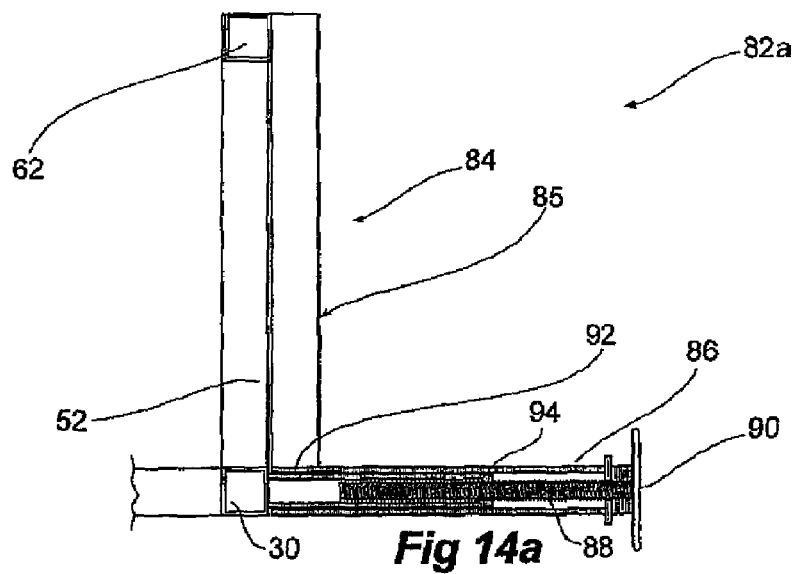
FIG. 14a illustrates a side view of the side wall of FIG. 13 when in a closed position.
Figure 14B:
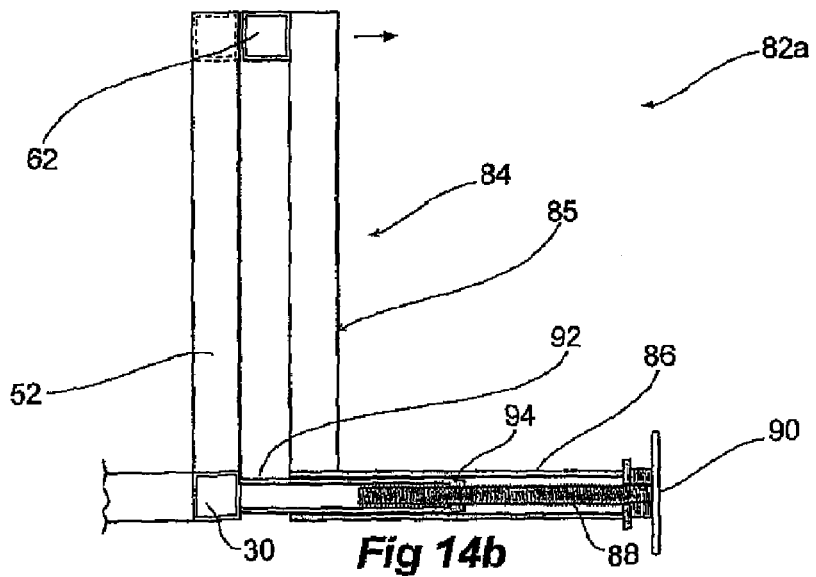
FIG. 14b illustrates a side view of the side wall of FIG. 13 being opened from the closed position shown in FIG. 14a to an open position.

In the position shown in FIG. 14a, the separating member 62 separates the upright posts 52 as previously described and the chasses 34 and 36 are unable to rotate. As those skilled in the art would realise, when the handles 90 are turned, this causes the L-shaped member 85 and hence the separating member 62 to shift in an outward direction. When shifted to the position shown in FIG. 14b, the longitudinally aligned upright posts 52 of the side members 28 and 30 are no longer forcibly spaced apart and the chasses 34 and 36 may be rotated and the rest of the folding procedure carried out as described previously. This system 82 also provides more aesthetic appeal to the trailer in that rather than having rotatable side flaps, the wheel guard 96 is integral with the inner side wall of the trailer 10.

Figure 15B:
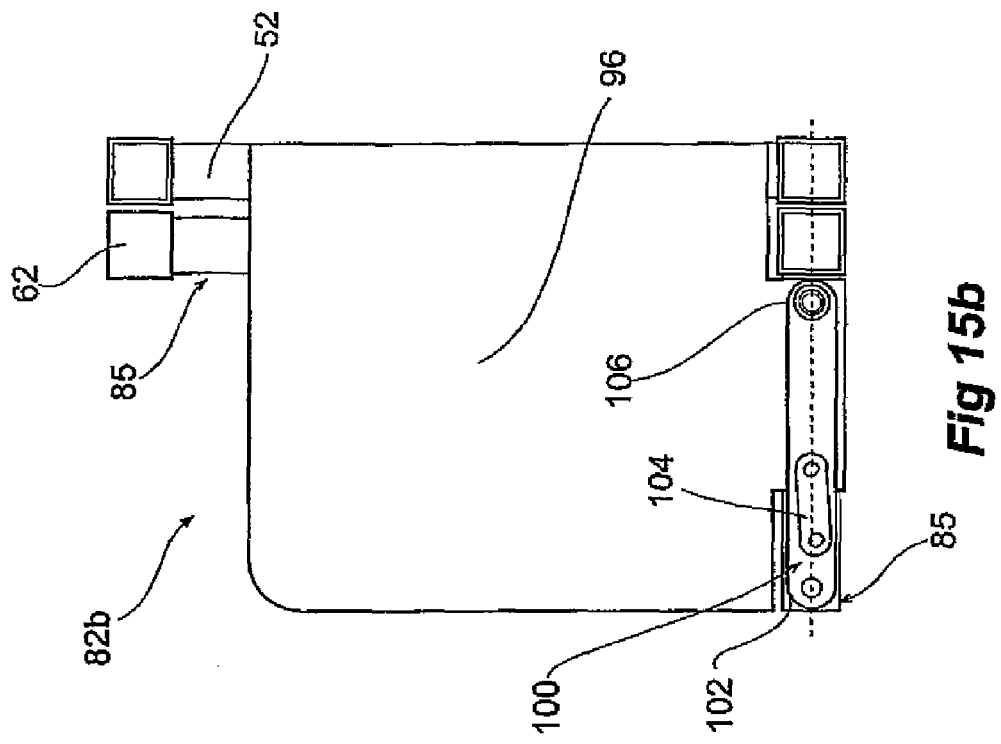
FIG. 15b illustrates a side view of the side wall of FIG. 15a when in the open position.
Figure 15A:
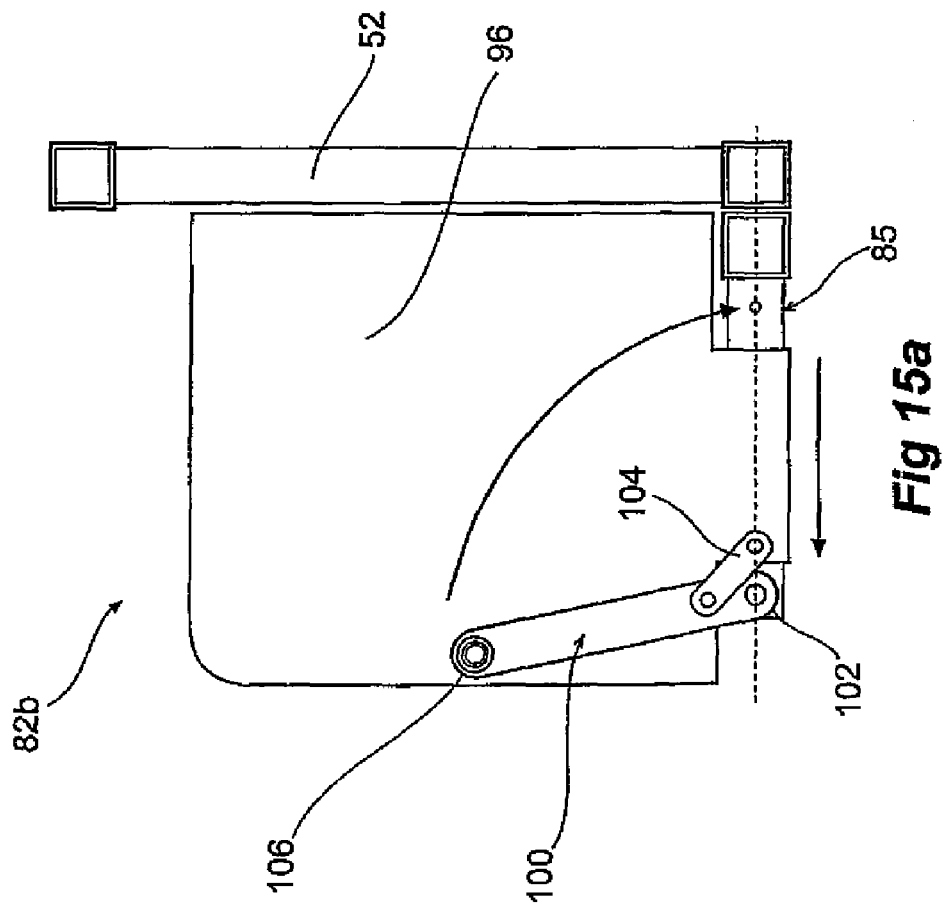
FIG. 15a illustrates a side view of a further alternately configured side wall when in the closed position, whereby movement of the wall is actuated using a lever mechanism.

FIG. 15a and FIG. 15b illustrate a further system 82b for moving the insert 62 from between the upright posts 52. This system involves rotating a lever 100 including a first end 102 which is connected to the L-shaped member 85 directly and to the side of the wheel guard 96 via a connecting pin 104, and a second end 106 which is free and adapted to be rotated manually. The pin 104 is pivotably connected at one end to the side of the wheel guard 96, and pivotally connected at its other end to the end 102 of the lever 100. The lever is also pivotably connected to the L-shaped member 85.

Those skilled in the art would realise that when the lever 100 is rotated from an upright position shown in FIG. 15*a* to a horizontal position shown in FIG. 15*b*, the end 102 of the lever 100 will be forced to move outwardly with respect to the trailer, thereby causing the L-shaped member 85 and hence the separating member 62 to also move outwardly.

Figure 16B:
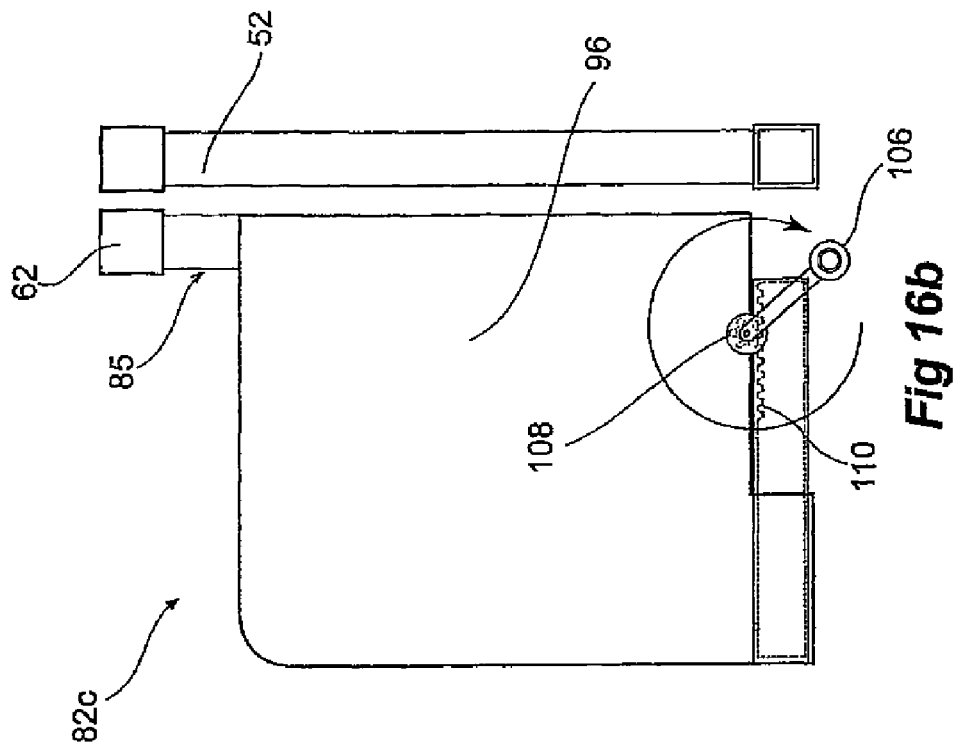
FIG. 16b illustrates a side view of the side wall of FIG. 16a when in the open position.
Figure 16A:
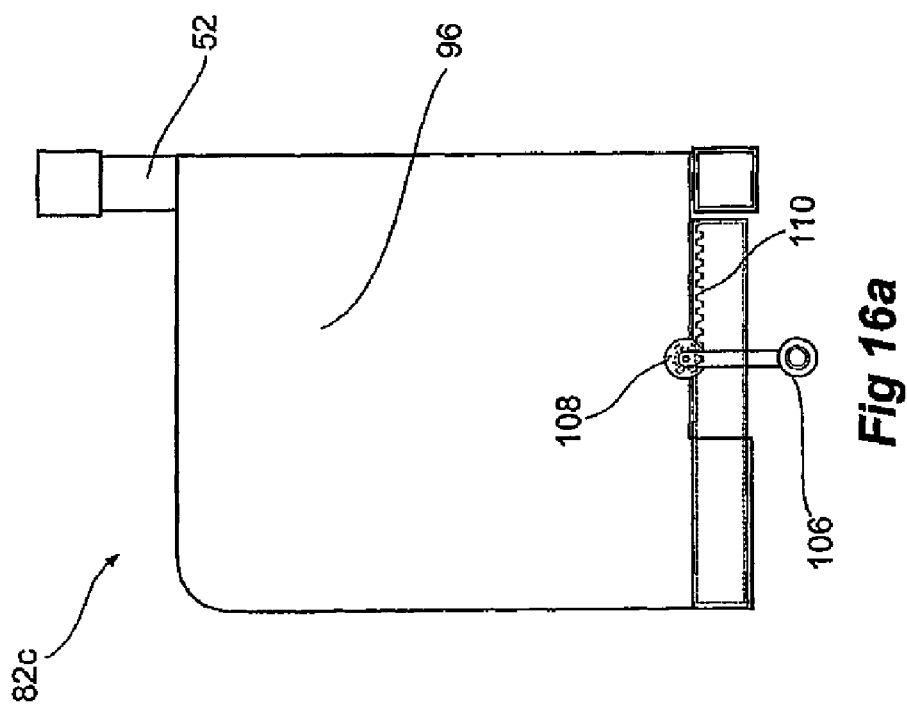
FIG. 16a illustrates a side view of a still further alternately configured side wall when in the closed position, whereby movement of the wall is actuated using a rack and pinion mechanism.
Figure 18A:
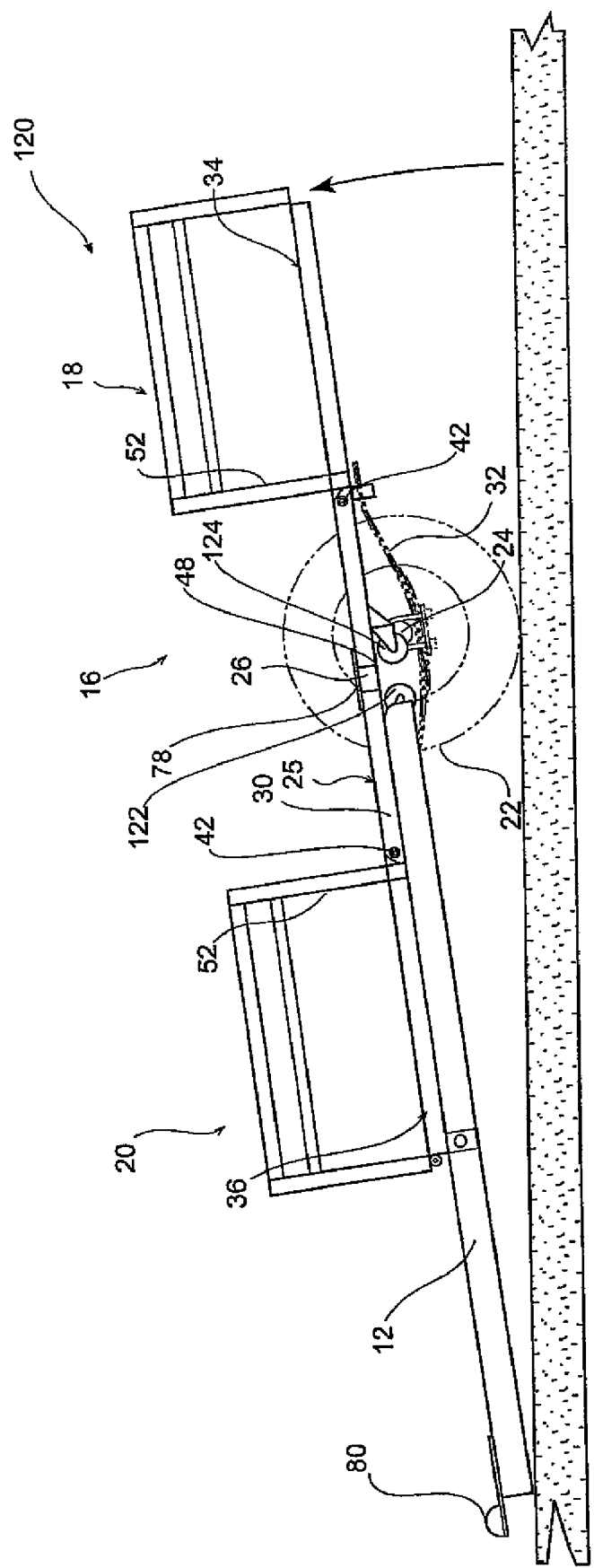
FIG. 18a illustrates a side view of a folding trailer according to a second embodiment of the present invention whereby the rear chassis portion of the trailer is lifted causing the front chassis portion to pivot, this being the second step in folding the trailer.
Figure 18B:
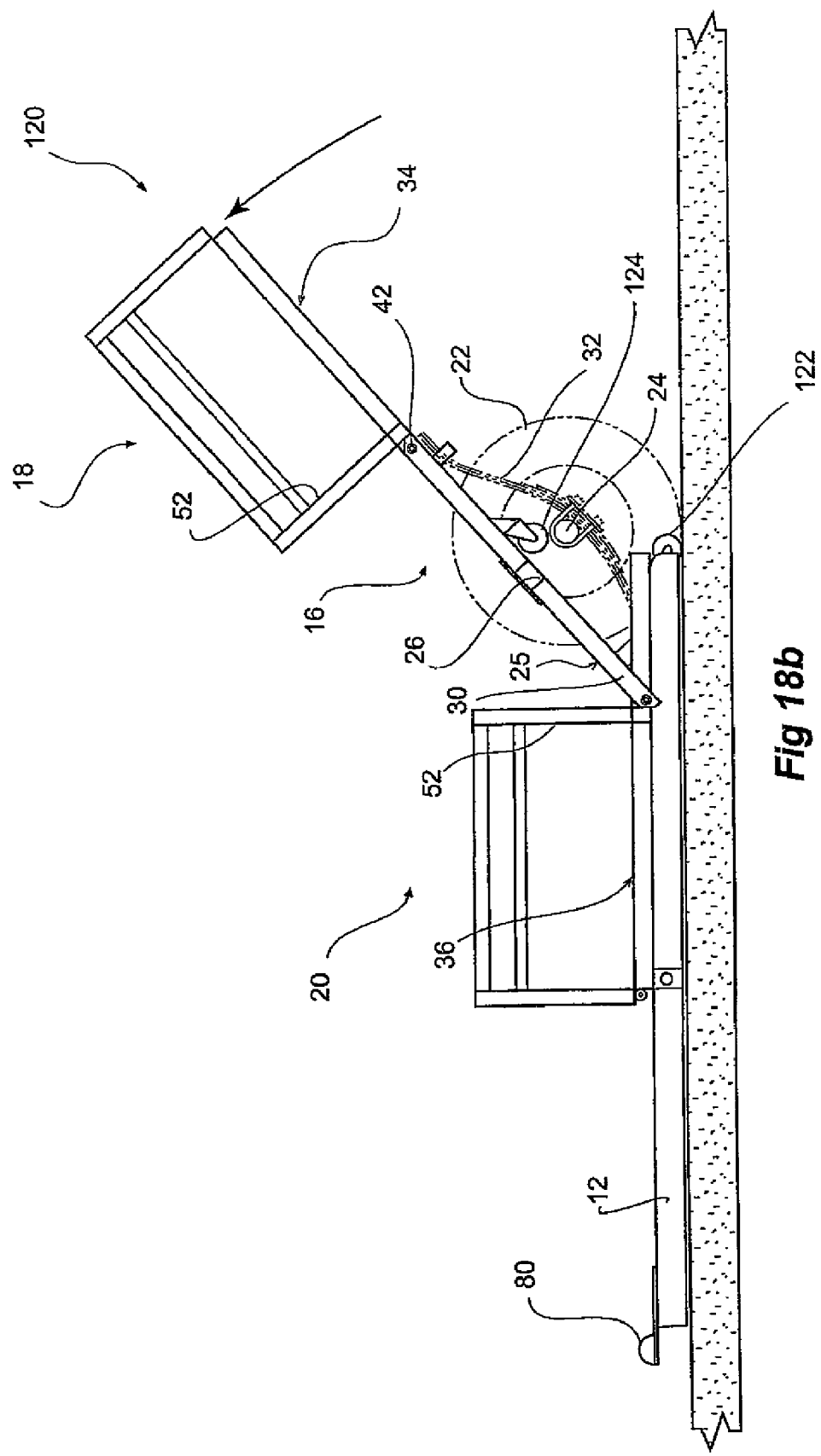
FIG. 18b illustrates a side view of the folding trailer of FIG. 18a whereby the rear chassis portion has been lifted to such an extent that the A-frame associated with the front chassis portion rests horizontally along the ground, this completing the second step in folding the trailer.
Figure 19:
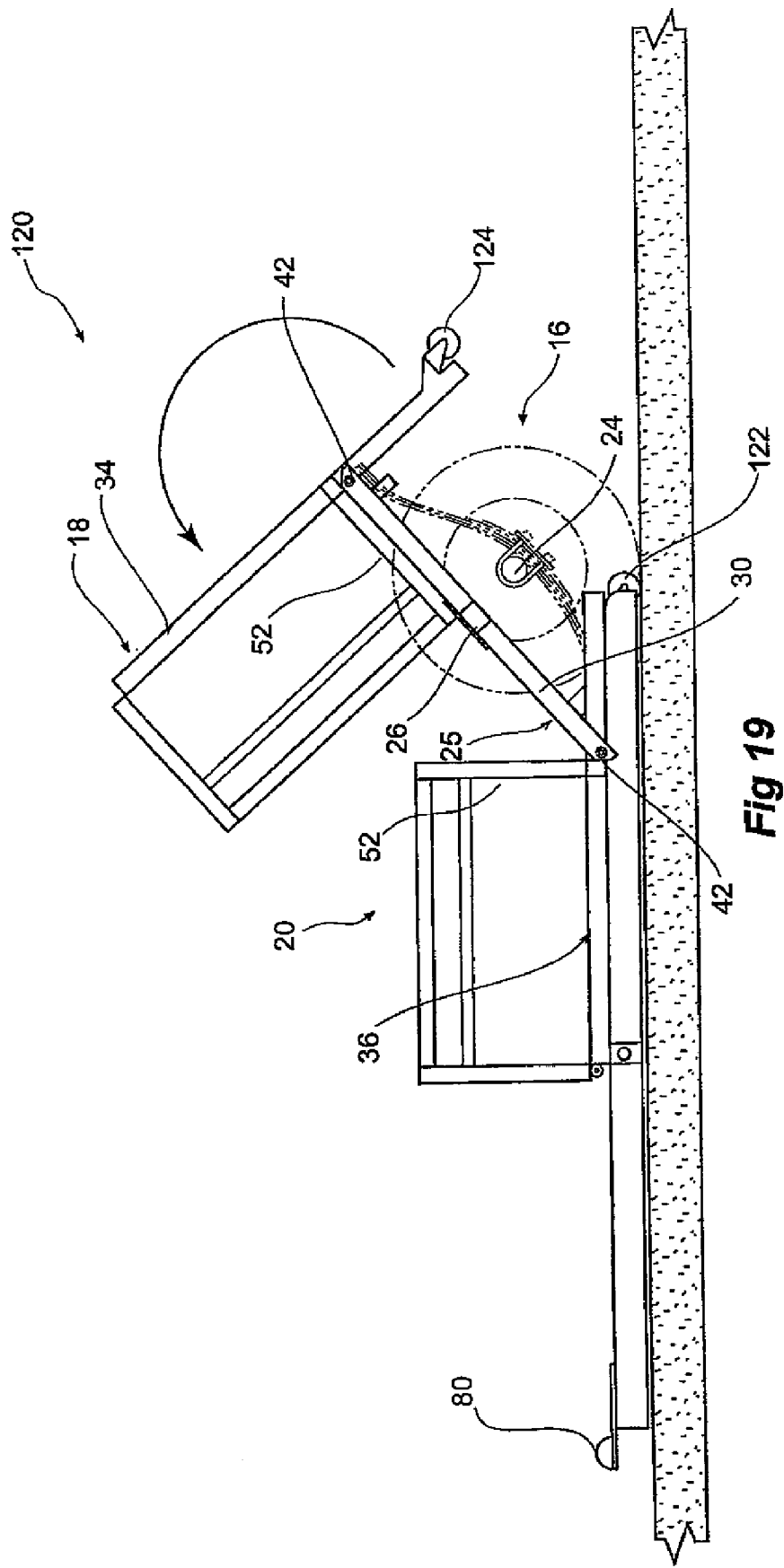
FIG. 19 illustrates a side view of the folding trailer of FIG. 18a whereby the rear chassis portion has been rotated about the rear pivot means by 90 degrees toward the front of the trailer, this being the third step in folding the trailer.
Figure 20:
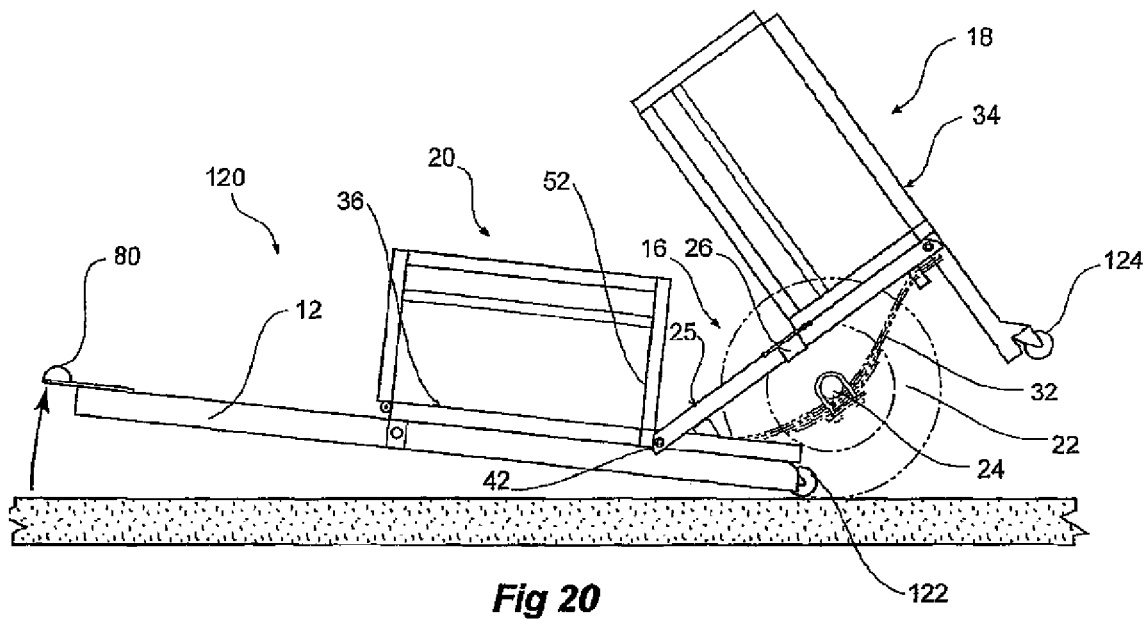
FIG. 20 illustrates a side view of the folding trailer of FIG. 18a whereby the A-frame associated with the front chassis portion of the trailer is rotated toward the rear of the trailer, this commencing the fourth and final step in folding the trailer.
Figure 21:
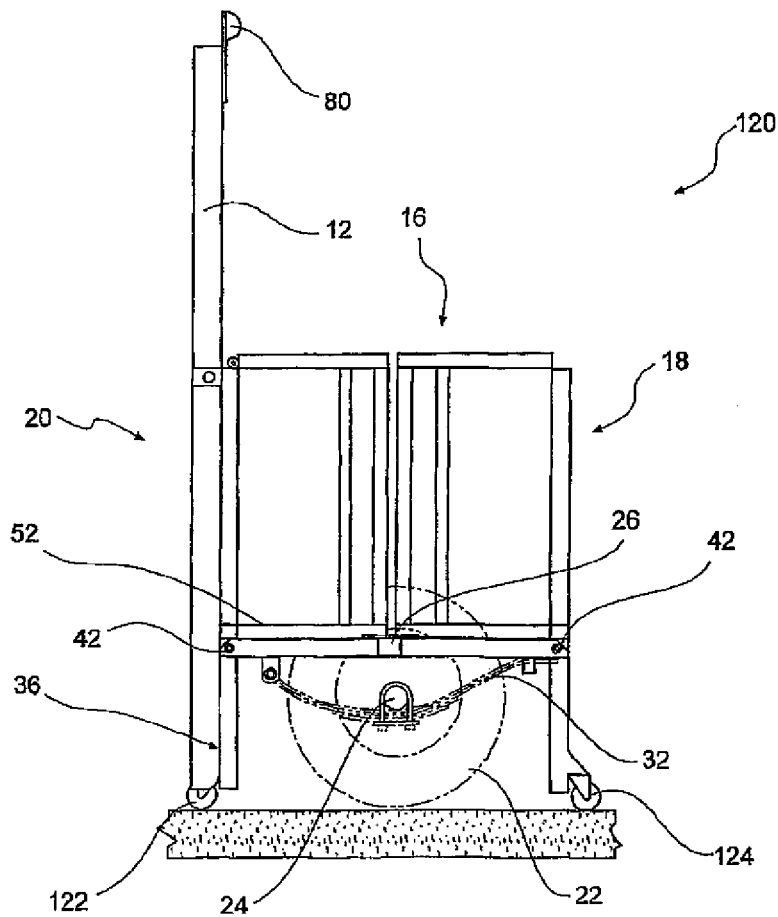
FIG. 21 illustrates a side view of the folding trailer of FIG. 18a whereby the A-frame of the trailer has been fully rotated towards the rear of the trailer, this completing the fourth and final step in folding the trailer.

A rack and pinion system 82*c* for moving the separating member 62 outwardly from the trailer is shown in FIG. 16*a* and FIG. 16*b*. By rotating the crank 106 from the position shown in FIG. 16*a* to the position shown in FIG. 16*b*, the pinion 108 rotates and thereby causes the rack 110 to move outwardly by well known means. The rack is connected to the L-shaped member 85 and hence the separating member 62 is also moved outwardly in this action.

A still further system 82*d* is shown in FIG. 17*a* and FIG. 17*b*. This system 82*d* involves the use of at least one spring 112 which biases the L-shaped member 85 outwards from the trailer. The L-shaped member is maintained in the position shown in FIG. 17*a* by use of a bolt 114 which threadably engages the L-shaped member 85 and a portion of the side wall 66 in a configuration which counteracts the bias of the spring 112. Thus, those skilled in the art would realise that as bolt 114 is unscrewed the L-shaped member 85 and hence the separating member 62 will move outwardly by action of the spring 112.

Other known means of achieving movement of the insert 62 so that it no longer maintains the spaced apart relationship between respective front and rear upright posts 52 may equally well be used.

FIGS. 18-21 illustrate a folding trailer 120 according to a second embodiment of the present invention and, in particular, the steps of folding the trailer 120 which are substantially the same as that described with respect to the first embodiment. It is to be understood that those features of the trailer 120 which are the same as those of trailer 10 are not assigned new reference numbers and will not be described again. Further, some of the features of the trailer previously described are not shown for the purpose of clarifying the features of this particular embodiment.

The folding trailer 120 differs from the folding trailer 10 only in that the transverse cross member 26 is no longer rearwardly offset from the centre of the chassis 14, but is rather positioned directly at the centre of the chassis 14. Those skilled in the art will realise that this does not affect the way the trailer 120 is folded, however, when the trailer is folded the front 20 and rear 18 chassis portions will extend the same distance below the central chassis portion 16.

Accordingly, the trailer can no longer be stabilised between the trailer wheels and the front chassis portion, but requires the use of jockey wheels 122 and 124 associated with the front 20 and rear 18 chassis portions respectively. The jockey wheel 122 is configured slightly differently to jockey wheel 124 in that when the trailer is folded to the position shown in FIG. 18*b*, if it were beneath the front chassis portion 20, as is jockey wheel 124, the A-frame would not be able to rest upon the ground as shown. This however is not essential, and the configuration of jockey wheels 122 and 124 may well be identical. When in the compact state shown in FIG. 21, it will be appreciated that the jockey wheels are positioned to elevate the trailer wheels 22 slightly above the ground.

The skilled addressee will further appreciate that having the jockey wheels 122 and 124 mounted in the positions shown, they will contact the wheel axle 24 when the trailer 120 is being unfolded. This may be overcome by having an alternately configured wheel axle (not shown) which allows for the trailer to be folded without contacting the jockey wheels 122 and 124, or by having retractable jockey wheels (not shown) which are hidden inside the chassis in a configuration which allows them to be retracted when appropriate, or by simply mounting the jockey wheels to the front and rear chassis portions after folding.

Figure 22:
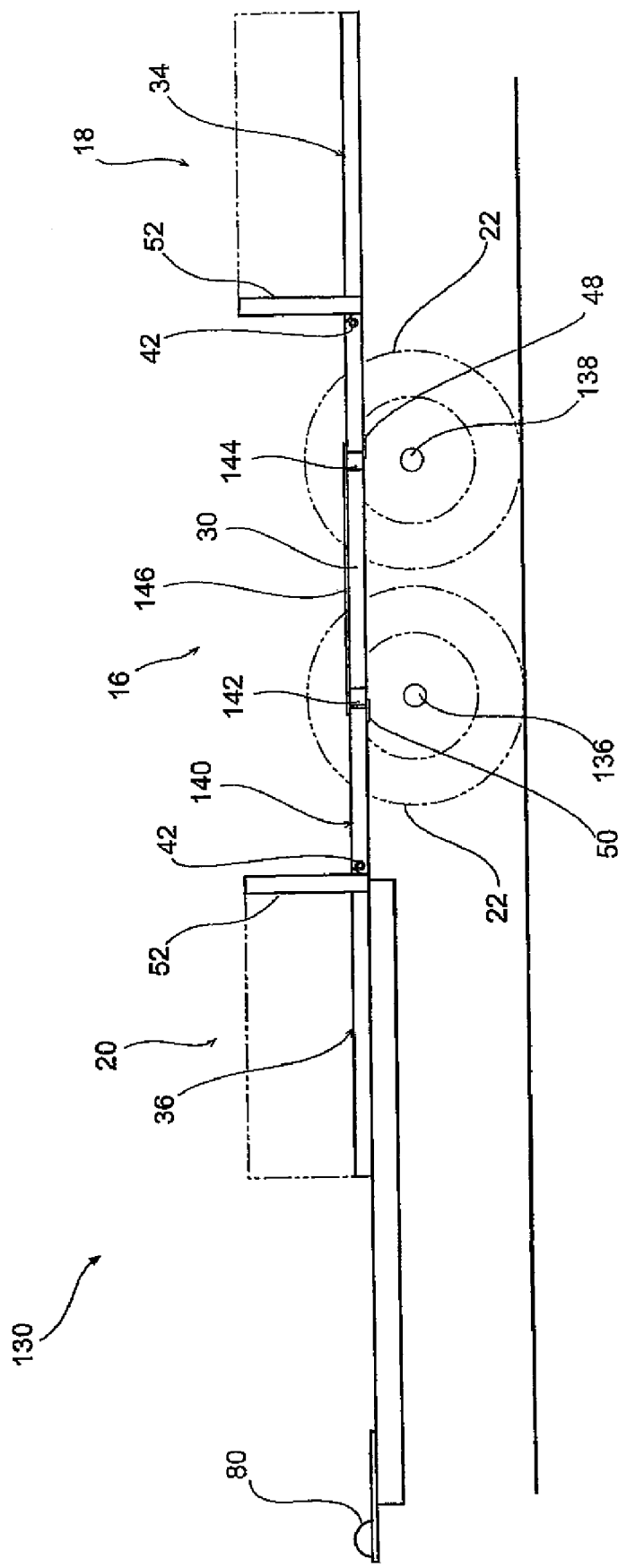
FIG. 22 illustrates a side view of a folding trailer according to a third embodiment of the present invention including two wheel axles, the trailer being shown in a fully expanded state.

The third and final embodiment of the present invention relates to a double-axle trailer 130 as shown in FIGS. 22-23. Again, like parts will be referred to using like reference numbers.

Insofar as the folding mechanism is concerned, trailer 130 may involve either of the folding systems of trailers 10 or 120. As mentioned, the difference between trailer 130 and the other two trailers is that trailer 130 is a double-axe trailer, that is, it includes two pairs of wheels 132 and 134 coupled via two respective axles 136 and 138. In consequence, the trailer 130 must include a new central chassis portion 140 whereby the length of the side members of the central chassis portion 140 are extended to accommodate for the additional axle and rather than having a single cross member, there are now two spaced apart cross members 146 and 148 located above each axle 136 and 138 respectively. There must now also be two panels attached above the two cross members 142 and 144, or alternatively, as is shown, there may be a single panel 146 extending over both cross members 142 and 144. Although not shown, it should be obvious that the systems for separating each pair of longitudinally aligned upright posts 52 must also have increased length to accommodate for their increased spaced apart distance. Also, the trailer 130 may include further reinforcing members (not shown) associated with their chasses.

Apart from the abovementioned alterations, the working of the trailer 130 and the way in which it folds is identical to that of the trailers 10 and 120. As those skilled in the art would realise, because the trailer 130 includes two wheel axles 136 and 138 and an extended central chassis portion 140, the overall size of the trailer once folded will be larger than that of previous embodiments. However, this size is still significantly smaller than a double-axle trailer in its expanded state and is still therefore beneficial in terms of storage.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any of the claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A trailer adapted to be folded between an expanded state and a compact state, said trailer characterised by:
at least one wheel axle;
a longitudinal chassis supported above said at least one wheel axle, said chassis having a central chassis portion, a front chassis portion and a rear chassis portion configured such that when said trailer is in the expanded state, the front, central and rear chassis portions extend in a substantially horizontal plane;

said central chassis portion being substantially H-shaped and comprising a transverse cross member and two elongate side members each of which includes front and rear pivot means at longitudinal ends thereof, the distance between the rear pivot means and the transverse cross member being different to that between the front pivot means and the transverse cross member, said front and rear pivot means adapted to pivotably connect respective front and rear chassis portions to the central chassis portion;

said rear chassis portion including side members extending along and substantially parallel with an inside of a rearward extension of the central chassis side members and being of a length such that a front member thereof extends substantially parallel with and alongside the rear of the central chassis transverse cross member, said rear chassis portion being rotatable about a pivot axis extending through said rear pivot means, said rear chassis portion being adapted to be folded about the rear pivot means in a forwards direction such that said rear chassis front member rotates downwardly and rearwardly to a position in which the rear chassis portion extends in a substantially upright configuration;

said front chassis portion including side members extending along and substantially parallel with an inside of a forward extension of the central chassis side members and being of a length such that a rear member thereof extends substantially parallel with and alongside the front of the central chassis transverse cross member, said front chassis portion being rotatable about a pivot axis extending through each of said front pivot means, said front chassis portion being adapted to be folded about the front pivot means in a rearwards direction such that said front chassis rear member rotates downwardly and forwardly to a position in which the front chassis portion extends in a substantially upright configuration; and whereby such folding causes at least one of said front member of said rear chassis portion to extend further below the central chassis portion than the rear member of the front chassis portion and to a position adjacent a ground surface to thereby provide a support for said trailer in the compact state when the distance between the rear pivot means and transverse cross member is greater than that between the front pivot means and transverse cross member, and said rear member of the front chassis portion to extend further below the central chassis portion than said front member of the rear chassis portion and to a position adjacent the ground surface to thereby provide a support for said trailer in the compact state when the distance between the front pivot means and transverse cross member is greater than that between the rear pivot means and transverse cross member.

2. A trailer as characterised in claim 1 wherein the front chassis portion includes an A-frame fixed thereto and extending in the forwards direction, said A-frame adapted to removably attach the trailer to a towing vehicle when the trailer is in the expanded state.

3. A trailer as characterised in claim 1, wherein the front member of the rear chassis portion has associated therewith at least one wheel adapted to assist in moving the trailer while in the compact state.

4. A trailer as characterised in claim 1, wherein said trailer further includes a first retaining means for preventing upward rotation of the front member of the rear chassis portion and rear member of the front chassis portion, and a second retaining means for preventing upward rotation of the rear member of the rear chassis portion and front member of the front chassis portion, when the trailer is in the expanded state.

5. A trailer as characterised in claim 4, wherein the first retaining means is in the form of a lip associated with the transverse cross-member of the central chassis portion, said lip adapted to prevent rotation of the rear member of the front chassis and the front member of the rear chassis upwardly beyond the transverse cross member.

6. A trailer as characterised in claim 4, wherein each of the front and rear chassis portions includes at least one respective upright projection, and wherein said second retaining means is in the form of a moveable insert which serves to maintain respective front and rear projections in a spaced apart relationship.

7. A trailer as characterised in claim 6, wherein the moveable insert forms part of a side wall of the trailer, the side wall being associated with the central chassis portion such that it is moveable with respect thereto from a first position in which said insert is positioned between the respective front and rear projections, and a second position in which the insert is not positioned between the respective front and rear projections.

8. A trailer as characterised in claim 7 wherein the side walls are pivotably associated with the central chassis portion.

9. A trailer as characterised in claim 7 wherein the side walls are threadably associated with the central chassis portion.

10. A trailer as characterised in claim 7 wherein the side walls are associated with the central chassis portion by way of a lever mechanism.

11. A trailer as characterised in claim 7 wherein the side walls are associated with the central chassis portion by way of a rack and pinion mechanism.

12. A trailer as characterised in claim 7 wherein the side walls are associated with the central chassis portion by way of a spring mechanism.

13. A trailer as characterised in claim 1 wherein the front chassis portion, rear chassis portion, and central chassis portion include respective trays mounted there above such that when the trailer is in the expanded state, the trays become aligned substantially parallel with the horizontal plane to thereby form a single flush surface upon which items may be supported.

14. A trailer as characterised in claim 1 wherein the front chassis portion includes a front wall and front chassis side walls, and the rear chassis portion includes an accessible rear wall and rear chassis side walls, whereby each wall extends substantially upright from the corresponding chassis portions.

15. A trailer adapted to be folded between an expanded state and a compact state, said trailer characterised by:
at least one wheel axle;
a longitudinal chassis supported above said at least one wheel axle, said chassis having a central chassis portion, a front chassis portion and a rear chassis portion configured such that when said trailer is in the expanded state, the front, central and rear chassis portions extend in a substantially horizontal plane;
said central chassis portion including pivot means at longitudinal ends thereof and a transversely extending cross member, said pivot means adapted to pivotably connect respective front and rear chassis portions to the central chassis portion, said rear chassis portion being adapted to be folded about the rear pivot means in a forwards direction to a position in which the rear chassis portion extends in a substantially upright configuration, and said front chassis portion being adapted to be folded about the front pivot means in a rearwards direction to a position in which the front chassis portion extends in a substantially upright configuration;

whereby in the expanded state, a front end of each of the front and rear chassis portions extend a predetermined distance forwardly of their associated pivot means, and a rear end of each of the front and rear chassis portions extend a predetermined distance rearwardly of their associated pivot means; and whereby the transverse cross member is positioned at the centre of the chassis and the at least one wheel axle is rearwardly offset from said centre such that folding of the trailer causes the rear end of the front chassis and the front end of the rear chassis to extend an equal distance below the at least one wheel axle to a position adjacent the ground surface to thereby provide support for said trailer in the compact state.

16. A trailer as characterised in claim 15 wherein the front chassis portion includes an A-frame fixed thereto and extending in the forwards direction, said A-frame adapted to removably attach the trailer to a towing vehicle when the trailer is in the expanded state.

17. A trailer as characterised in claim 16, wherein the rear end of the front chassis portion and the front end of the rear chassis portion include respective castor wheels positioned to elevate the trailer when in the compact state to thereby assist in moving the compact trailer upon the castor wheels.

18. A trailer adapted to be folded between an expanded state and a compact state, said trailer characterised by:
   at least one wheel axle;
   a longitudinal chassis supported above said at least one wheel axle, said chassis having a central chassis portion, a front chassis portion and a rear chassis portion configured such that when said trailer is in the expanded state, the front, central and rear chassis portions extend in a substantially horizontal plane;
   said central chassis portion including pivot means at longitudinal ends thereof and a transversely extending cross member, said at least one wheel axle being rearwardly offset from the centre of the chassis, said pivot means adapted to pivotably connect respective front and rear chassis portions to the central chassis portion, said rear chassis portion being adapted to be folded about the rear pivot means in a forwards direction to a position in which the rear chassis portion extends in a substantially upright configuration, and said front chassis portion being adapted to be folded about the front pivot means in a rearwards direction to a position in which the front chassis portion extends in a substantially upright configuration;
   whereby in the expanded state, a front end of each of the front and rear chassis portions extend a predetermined distance forwardly of their associated pivot means, and a rear end of each of the front and rear chassis portions a predetermined distance rearwardly of their associated pivot means;
   whereby said trailer further includes a first retaining means for preventing upward rotation of the front end of the rear chassis portion and rear end of the front chassis portion, and a second retaining means for preventing upward rotation of the rear end of the of the rear chassis portion and front end of the front chassis portion, when the trailer is in the expanded state;
   whereby each of the front and rear chassis portions includes at least one respective upright projection, and wherein said second retaining means is in the form of a moveable insert which serves to maintain respective front and rear projections in a spaced apart relationship; and
   wherein the moveable insert forms part of a side wall of the trailer, the side wall being associated with the central chassis portion such that it is moveable with respect thereto from a first position in which said insert is positioned between the respective front and rear projections, and a second position in which the insert is not positioned between the respective front and rear projections.

19. A trailer as characterised in claim 18 wherein the first retaining means is in the form of a lip associated with the transverse cross member of the central chassis portion, said lip preventing upward rotation of the front end of the rear chassis and rear end of the front chassis upwardly beyond the transverse cross member.

* * * * *